(12) United States Patent
Xu et al.

(10) Patent No.: US 10,728,542 B2
(45) Date of Patent: Jul. 28, 2020

(54) METHODS AND APPARATUSES FOR SUB-BLOCK MOTION VECTOR PREDICTION

(71) Applicant: Tencent America LLC, Palo Alto, CA (US)

(72) Inventors: Xiaozhong Xu, State College, PA (US); Xiang Li, Los Gatos, CA (US); Shan Liu, San Jose, CA (US)

(73) Assignee: Tencent America LLC, Palo Alto, CA (US)

( * ) Notice: Subject to any disclaimer, the term of this patent is extended or adjusted under 35 U.S.C. 154(b) by 0 days.

(21) Appl. No.: 16/362,596

(22) Filed: Mar. 22, 2019

(65) Prior Publication Data
US 2019/0313091 A1 Oct. 10, 2019

Related U.S. Application Data

(60) Provisional application No. 62/655,065, filed on Apr. 9, 2018.

(51) Int. Cl.
*H04N 19/105* (2014.01)
*H04N 19/176* (2014.01)
(Continued)

(52) U.S. Cl.
CPC ......... *H04N 19/105* (2014.11); *H04N 19/119* (2014.11); *H04N 19/137* (2014.11);
(Continued)

(58) Field of Classification Search
CPC ... H04N 19/105; H04N 19/119; H04N 19/137
See application file for complete search history.

(56) References Cited

U.S. PATENT DOCUMENTS 6,426,976 B1  7/2002  Wen et al.
8,526,495 B2  9/2013  Liu et al.
(Continued)

OTHER PUBLICATIONS

G. J. Sullivan, J.-R.Ohm, W.-J. Han, and T. Wiegand, "Overview of the high efficiency video coding (HEVC) standard," IEEE Trans. Circuits Syst. Video Technol., vol. 22, No. 12, pp. 1649-1668, Dec. 2012.

(Continued)

*Primary Examiner* — Irfan Habib
(74) *Attorney, Agent, or Firm* — Oblon, McClelland, Maier & Neustadt, L.L.P.

(57) ABSTRACT

Aspects of the disclosure provide methods and apparatuses for video encoding/decoding. In some examples, an apparatus for video decoding includes processing circuitry. The processing circuitry decodes prediction information for a current block in a current coded picture that is a part of a coded video sequence. The prediction information indicates whether a planar motion vector prediction mode is used for the current block. The current block is partitioned into a plurality of sub-blocks. When it is indicated that a planar motion vector prediction mode is used for the current block, the processing circuitry determines, in response to the use of the planar motion vector prediction mode, at least one temporal motion vector predictor (TMVP) candidate for a bottom-right (BR) corner of the current block. Then the processing circuitry reconstructs the current block according to one of the at least one TMVP candidate for the BR corner.

20 Claims, 13 Drawing Sheets

(51) Int. Cl.
*H04N 19/119* (2014.01)
*H04N 19/137* (2014.01)
*H04N 19/159* (2014.01)
*H04N 19/513* (2014.01)

(52) U.S. Cl.
CPC ......... *H04N 19/159* (2014.11); *H04N 19/176* (2014.11); *H04N 19/513* (2014.11)

(56) References Cited

U.S. PATENT DOCUMENTS

| | | | |
|---|---|---|---|
| 9,049,452 B2 | 6/2015 | Liu et al. | |
| 9,148,666 B2* | 9/2015 | Park | H04N 19/463 |
| 9,445,098 B2* | 9/2016 | Kim | H04N 19/176 |
| 9,510,012 B2 | 11/2016 | Liu et al. | |
| 9,813,726 B2 | 11/2017 | Liu et al. | |
| 9,843,820 B2* | 12/2017 | Lin | H04N 19/597 |
| 10,547,868 B2* | 1/2020 | Chen | H04N 19/132 |
| 2013/0089136 A1* | 4/2013 | Srinivasan | H04N 19/159 375/240.03 |
| 2013/0272411 A1* | 10/2013 | Tu | H04N 19/105 375/240.16 |
| 2013/0294511 A1* | 11/2013 | Sjoberg | H04N 19/50 375/240.12 |
| 2013/0329794 A1* | 12/2013 | Jeon | H04N 19/61 375/240.12 |
| 2015/0085935 A1* | 3/2015 | Chen | H04N 19/597 375/240.16 |
| 2015/0124880 A1* | 5/2015 | Kim | H04N 19/159 375/240.12 |
| 2015/0201215 A1* | 7/2015 | Chen | H04N 19/597 348/42 |
| 2015/0341664 A1* | 11/2015 | Zhang | H04N 19/597 375/240.12 |
| 2017/0353730 A1 | 12/2017 | Liu et al. | |
| 2017/0374369 A1 | 12/2017 | Chuang et al. | |
| 2019/0116381 A1* | 4/2019 | Lee | H04N 19/176 |
| 2019/0222843 A1* | 7/2019 | Lee | H04N 19/124 |
| 2019/0268611 A1* | 8/2019 | Chen | H04N 19/176 |
| 2019/0327482 A1* | 10/2019 | Lin | H04N 19/176 |
| 2019/0342547 A1* | 11/2019 | Lee | H04N 19/52 |
| 2019/0394460 A1* | 12/2019 | Lee | H04N 19/105 |
| 2020/0021805 A1* | 1/2020 | Ko | H04N 19/11 |

OTHER PUBLICATIONS

Jianle Chen, et al, "Algorithm Description of Joint Exploration Test Model 7 (JEM 7)", JVET-G1001, Joint Video Exploration Team (JVET) of ITU-T SG 16 WP 3 and ISO/IEC JTC 1/SC 29/WG 117th Meeting: Torino, IT, Jul. 2017.

N. Zhang, J. An, J. Zheng, "Planar Motion Vector Prediction", JVET-J0061, San Diego, US, Apr. 2018.

Jani Lainema, Frank Bossen, Woo-Jin Han, Junghye Min, and Kemal Ugur, "Intra Coding of the HEVC Standard", IEEE Trans. Circuits Syst. Video Technol., vol. 22, No. 12, pp. 1792-1801, Dec. 2012.

S. Shen, F. Liang and K. Luo, "Deformable motion model for Frame Rate Up-Conversion in video coding", 2016 IEEE Region 10 Conference (TENCON), , Nov. 2016.

S. Kamp and M. Wien, "Decoder-Side Motion Vector Derivation for Block-Based Video Coding", IEEE Transactions on Circuits and Systems for Video Technology, vol. 22, Issue: 12, pp. 1732-1745, Dec. 2012).

Shan Liu, JongWon Kim and C.-C. Jay Kuo, "Hybrid global/local motion compensated frame interpolation for low bit rate video coding," the Journal of Visual Communication and Image Representation, vol. 14, pp. 61-79, Jun. 2003.

Shan Liu, JongWon Kim and C.-C. Jay Kuo, "Nonlinear motion-compensated interpolation for low-bit-rate video" in Applications of Digital Image Processing XXIII, vol. 4115, p. 203-214, 2000.

Shan Liu, JongWon Kim and C.-C. Jay Kuo, "MCI-embedded motion-compensated prediction for quality enhancement of frame interpolation" in Multimedia Systems and Applications III, vol. 4209, p. 251-262, Apr. 25-27, 2001.

Xu, et al, "On unification of intra block copy and inter-picture motion compensation", ISO/IEC JTC1/SC29/WG11 JCTVC-Q0132, 2014.

Xu, et al, "Non-CE2: Intra BC merge mode with default candidates", ISO/IEC JTC1/SC29/WG11 JCTVC-S0123, 2014.

Xu, et al, "CE2: Test 3.2—Intra BC merge mode with default candidates", ISO/IEC JTC1/SC29/WG11 JCTVC-T0073, 2015.

International Search Report dated Jun. 24, 2019 in Application No. PCT/US2019/025758, 3 pages.

Daribo et al. "Arithmetic edge coding for arbitrarily shaped sub-block motion prediction in depth video compression." In 2012 19th IEEE International Conference on Images Processing, 5 pages, Oct. 3, 2012.

Written Opinion of the International Searching Authority dated Jun. 24, 2019 in Application No. PCT/US2019/025758, 11 pages.

* cited by examiner

METHODS AND APPARATUSES FOR SUB-BLOCK MOTION VECTOR PREDICTION

INCORPORATION BY REFERENCE

This present disclosure claims the benefit of priority to U.S. Provisional Application No. 62/655,065, "METHODS FOR SUB-BLOCK MOTION VECTOR PREDICTION" filed on Apr. 9, 2018, which is incorporated by reference herein in its entirety.

TECHNICAL FIELD

The present disclosure describes embodiments generally related to video coding.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Video coding and decoding can be performed using inter-picture prediction with motion compensation. Uncompressed digital video can include a series of pictures, each picture having a spatial dimension of, for example, 1920× 1080 luminance samples and associated chrominance samples. The series of pictures can have a fixed or variable picture rate (informally also known as frame rate), of, for example 60 pictures per second or 60 Hz. Uncompressed video has significant bitrate requirements. For example, 1080p60 4:2:0 video at 8 bit per sample (1920×1080 luminance sample resolution at 60 Hz frame rate) requires close to 1.5 Gbit/s bandwidth. An hour of such video requires more than 600 GBytes of storage space.

One purpose of video coding and decoding can be the reduction of redundancy in the input video signal, through compression. Compression can help reduce the aforementioned bandwidth or storage space requirements, in some cases by two orders of magnitude or more. Both lossless and lossy compression, as well as a combination thereof can be employed. Lossless compression refers to techniques where an exact copy of the original signal can be reconstructed from the compressed original signal. When using lossy compression, the reconstructed signal may not be identical to the original signal, but the distortion between original and reconstructed signals is small enough to make the reconstructed signal useful for the intended application. In the case of video, lossy compression is widely employed. The amount of distortion tolerated depends on the application; for example, users of certain consumer streaming applications may tolerate higher distortion than users of television distribution applications. The compression ratio achievable can reflect that: higher allowable/tolerable distortion can yield higher compression ratios.

Motion compensation can be a lossy compression technique and can relate to techniques where a block of sample data from a previously reconstructed picture or part thereof (reference picture), after being spatially shifted in a direction indicated by a motion vector (MV henceforth), is used for the prediction of a newly reconstructed picture or picture part. In some cases, the reference picture can be the same as the picture currently under reconstruction. MVs can have two dimensions X and Y, or three dimensions, the third being an indication of the reference picture in use (the latter, indirectly, can be a time dimension).

In some video compression techniques, an MV applicable to a certain area of sample data can be predicted from other MVs, for example from those related to another area of sample data spatially adjacent to the area under reconstruction, and preceding that MV in decoding order. Doing so can substantially reduce the amount of data required for coding the MV, thereby removing redundancy and increasing compression. MV prediction can work effectively, for example, because when coding an input video signal derived from a camera (known as natural video) there is a statistical likelihood that areas larger than the area to which a single MV is applicable move in a similar direction and, therefore, can in some cases be predicted using a similar motion vector derived from MVs of neighboring area. That results in the MV found for a given area to be similar or the same as the MV predicted from the surrounding MVs, and that in turn can be represented, after entropy coding, in a smaller number of bits than what would be used if coding the MV directly. In some cases, MV prediction can be an example of lossless compression of a signal (namely: the MVs) derived from the original signal (namely: the sample stream). In other cases, MV prediction itself can be lossy, for example because of rounding errors when calculating a predictor from several surrounding MVs.

Various MV prediction mechanisms are described in H.265/HEVC (ITU-T Rec. H.265, "High Efficiency Video Coding", December 2016). Out of the many MV prediction mechanisms that H.265 offers, described here is a technique henceforth referred to as "spatial merge".

Referring to FIG. 1, a current block (101) can include samples that have been found by the encoder during the motion search process to be predictable from a previous block of the same size that has been spatially shifted. Instead of coding that MV directly, the MV can be derived from metadata associated with one or more reference pictures, for example from the most recent (in decoding order) reference picture, using the MV associated with either one of five surrounding samples, denoted A0, A1, and B0, B1, B2 (102 through 106, respectively). In H.265, the MV prediction can use predictors from the same reference picture that the neighboring block is using.

SUMMARY

Aspects of the disclosure provide methods and apparatuses for video encoding/decoding. In some examples, an apparatus for video decoding includes receiving circuitry and processing circuitry.

The processing circuitry is configured to decode prediction information for a current block in a current coded picture that is a part of a coded video sequence. The prediction information indicates whether a planar motion vector prediction mode is used for the current block. The current block is partitioned into a plurality of sub-blocks. When it is indicated that a planar motion vector prediction mode is used for the current block, the processing circuitry is further configured to determine, in response to the use of the planar motion vector prediction mode, at least one temporal motion vector predictor (TMVP) candidate for a bottom-right (BR) corner of the current block. Then the processing circuitry reconstructs the current block according to one of the at least one TMVP candidate for the BR corner.

In an embodiment, a reference picture for the current block can be signaled in the prediction information.

In various embodiments, when a reference picture of the one of the at least one TMVP candidate for the BR corner is different from the reference picture of the current block, the processing circuitry can be further configured to scale the one of the at least one TMVP candidate for the BR corner to the reference picture of the current block. Accordingly the current block is reconstructed according to the scaled one of the at least one TMVP candidate for the BR corner. When the prediction information includes a motion vector difference (MVD) for the BR corner, the processing circuitry can be further configured to determine a final motion vector based on the one of the at least one TMVP candidate for the BR corner and the MVD for the BR corner.

In an embodiment, the at least one TMVP candidate includes a TMVP candidate that is determined based on a co-located block in a reference picture. The co-located block in the reference picture is in a same location as a sub-block at the BR corner in the current coded picture. The at least one TMVP candidate for the BR corner can include a TMVP candidate for a sub-block located inside of the current block and adjacent to the BR corner. The at least one TMVP candidate for the BR corner can include a TMVP candidate for a sub-block located inside of the current block and adjacent to a center of the current block.

According to the disclosure, the at least one TMVP candidate for the BR corner includes a TMVP candidate for a bottom-left (BL) neighboring sub-block of the current block. The at least one TMVP candidate for the BR corner can include a TMVP candidate for an above-right (AR) neighboring sub-block of the current block. Further, the at least one TMVP candidate for the BR corner can include a TMVP candidate that is a weighted average of motion vectors of a BL neighboring sub-block of the current block and an AR neighboring sub-block of the current block.

In an embodiment, the processing circuitry is further configured to select the one of the at least one TMVP candidate from the at least one TMVP candidate based a received index identifying the one of the at least one TMVP candidate. The processing circuitry can be further configured to select the one of the at least one TMVP candidate from the at least one TMVP candidate based a predetermined candidate order. The processing circuitry can be further configured to select the one of the at least one TMVP candidate from the at least one TMVP candidate based a pre-selected TMVP candidate.

In an embodiment, the sub-block at the BR corner is located outside of the current block. The sub-block at the BR corner can be inside of the current block.

According to embodiments, the processing circuity can be further configured to derive a motion vector predictor for each sub-block in the current block according to the one of the at least one TMVP candidate for the BR corner. Then the processing circuitry reconstructs the current block according to the motion vector predictor for each of the sub-blocks in the current block.

Aspects of the disclosure also provide a non-transitory computer-readable medium storing instructions which when executed by a computer for video decoding cause the computer to perform the method for video decoding.

BRIEF DESCRIPTION OF THE DRAWINGS

Further features, the nature, and various advantages of the disclosed subject matter will be more apparent from the following detailed description and the accompanying drawings in which.

DETAILED DESCRIPTION OF EMBODIMENTS

Figure 1:
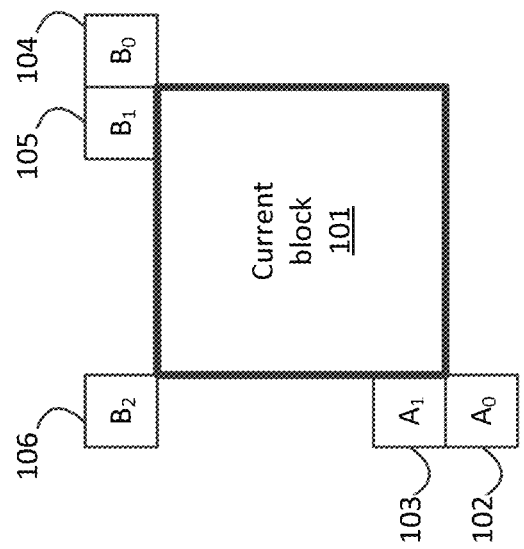
FIG. 1 is a schematic illustration of a current block and surrounding spatial merge candidates of the current block in one example.
Figure 2:
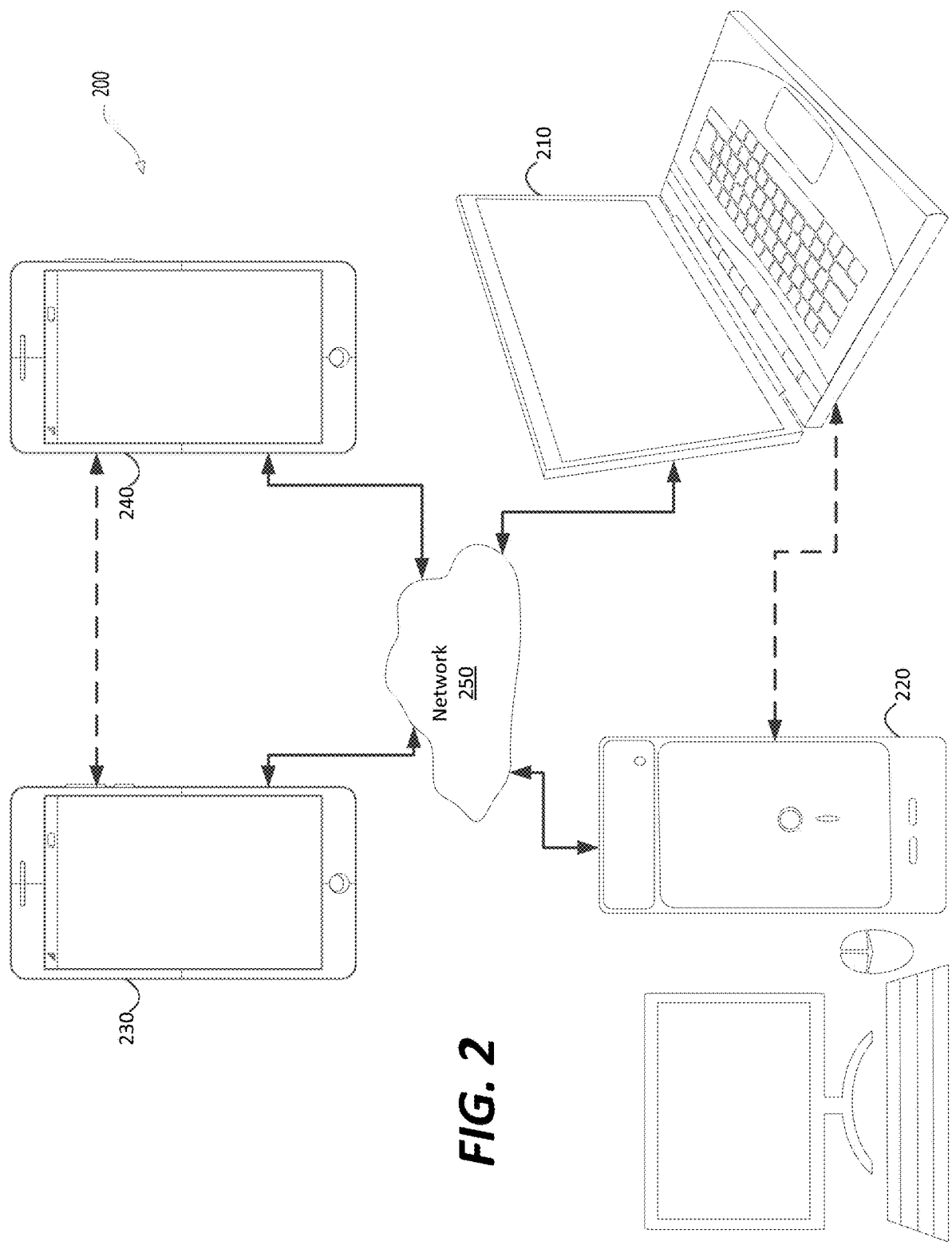
FIG. 2 is a schematic illustration of a simplified block diagram of a communication system in accordance with an embodiment.

FIG. 2 illustrates a simplified block diagram of a communication system (200) according to an embodiment of the present disclosure. The communication system (200) includes a plurality of terminal devices that can communicate with each other, via, for example, a network (250). For example, the communication system (200) includes a first pair of terminal devices (210) and (220) interconnected via the network (250). In the FIG. 2 example, the first pair of terminal devices (210) and (220) performs unidirectional transmission of data. For example, the terminal device (210) may code video data (e.g., a stream of video pictures that are captured by the terminal device (210)) for transmission to the other terminal device (220) via the network (250). The encoded video data can be transmitted in the form of one or more coded video bitstreams. The terminal device (220) may receive the coded video data from the network (250), decode the coded video data to recover the video pictures and display video pictures according to the recovered video data. Unidirectional data transmission may be common in media serving applications and the like.

In another example, the communication system (200) includes a second pair of terminal devices (230) and (240) that performs bidirectional transmission of coded video data that may occur, for example, during videoconferencing. For bidirectional transmission of data, in an example, each terminal device of the terminal devices (230) and (240) may code video data (e.g., a stream of video pictures that are captured by the terminal device) for transmission to the other terminal device of the terminal devices (230) and (240) via the network (250). Each terminal device of the terminal devices (230) and (240) also may receive the coded video data transmitted by the other terminal device of the terminal devices (230) and (240), and may decode the coded video data to recover the video pictures and may display video pictures at an accessible display device according to the recovered video data.

In the FIG. 2 example, the terminal devices (210), (220), (230) and (240) may be illustrated as servers, personal computers and smart phones but the principles of the present disclosure may be not so limited. Embodiments of the present disclosure find application with laptop computers, tablet computers, media players and/or dedicated video conferencing equipment. The network (250) represents any number of networks that convey coded video data among the terminal devices (210), (220), (230) and (240), including for example wireline (wired) and/or wireless communication networks. The communication network (250) may exchange data in circuit-switched and/or packet-switched channels. Representative networks include telecommunications networks, local area networks, wide area networks and/or the Internet. For the purposes of the present discussion, the architecture and topology of the network (250) may be immaterial to the operation of the present disclosure unless explained herein below.

Figure 3:
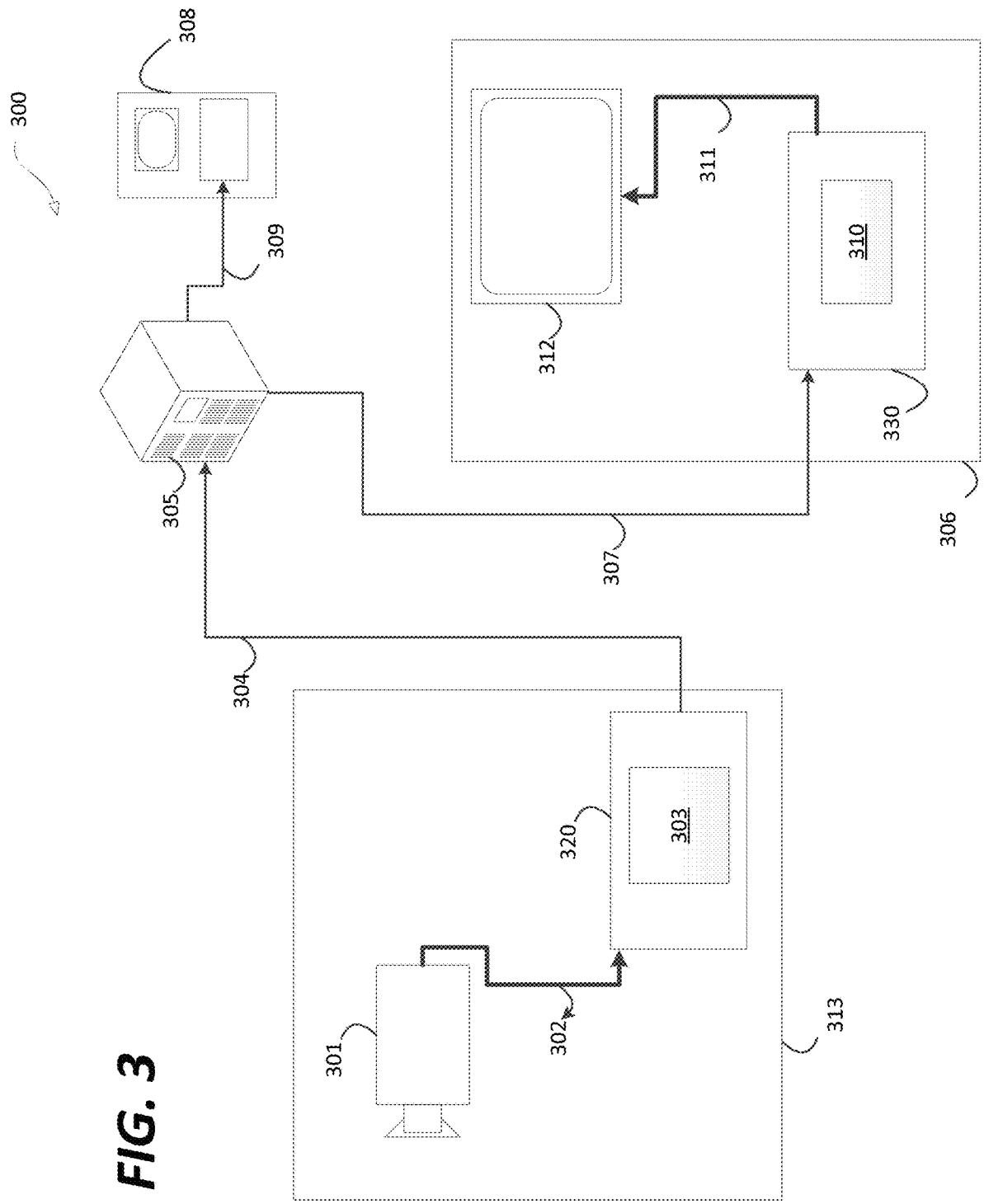
FIG. 3 is a schematic illustration of a simplified block diagram of a communication system in accordance with an embodiment.

FIG. 3 illustrates, as an example for an application for the disclosed subject matter, the placement of a video encoder and a video decoder in a streaming environment. The disclosed subject matter can be equally applicable to other video enabled applications, including, for example, video conferencing, digital TV, storing of compressed video on digital media including CD, DVD, memory stick, and the like.

A streaming system may include a capture subsystem (313) that can include a video source (301), for example a digital camera, creating for example a stream of video pictures (302) that are uncompressed. In an example, the stream of video pictures (302) includes samples that are taken by the digital camera. The stream of video pictures (302), depicted as a bold line to emphasize a high data volume when compared to encoded video data (304) (or coded video bitstreams), can be processed by an electronic device (320) that includes a video encoder (303) coupled to the video source (301). The video encoder (303) can include hardware, software, or a combination thereof to enable or implement aspects of the disclosed subject matter as described in more detail below. The encoded video data (304) (or encoded video bitstream (304)), depicted as a thin line to emphasize the lower data volume when compared to the stream of video pictures (302), can be stored on a streaming server (305) for future use. One or more streaming client subsystems, such as client subsystems (306) and (308) in FIG. 3 can access the streaming server (305) to retrieve copies (307) and (309) of the encoded video data (304). A client subsystem (306) can include a video decoder (310), for example, in an electronic device (330). The video decoder (310) decodes the incoming copy (307) of the encoded video data and creates an outgoing stream of video pictures (311) that can be rendered on a display (312) (e.g., display screen) or other rendering device (not depicted). In some streaming systems, the encoded video data (304), (307), and (309) (e.g., video bitstreams) can be encoded according to certain video coding/compression standards. Examples of those standards include ITU-T Recommendation H.265. In an example, a video coding standard under development is informally known as Versatile Video Coding (VVC). The disclosed subject matter may be used in the context of VVC.

It is noted that the electronic devices (320) and (330) can include other components (not shown). For example, the electronic device (320) can include a video decoder (not shown) and the electronic device (330) can include a video encoder (not shown) as well.

Figure 4:
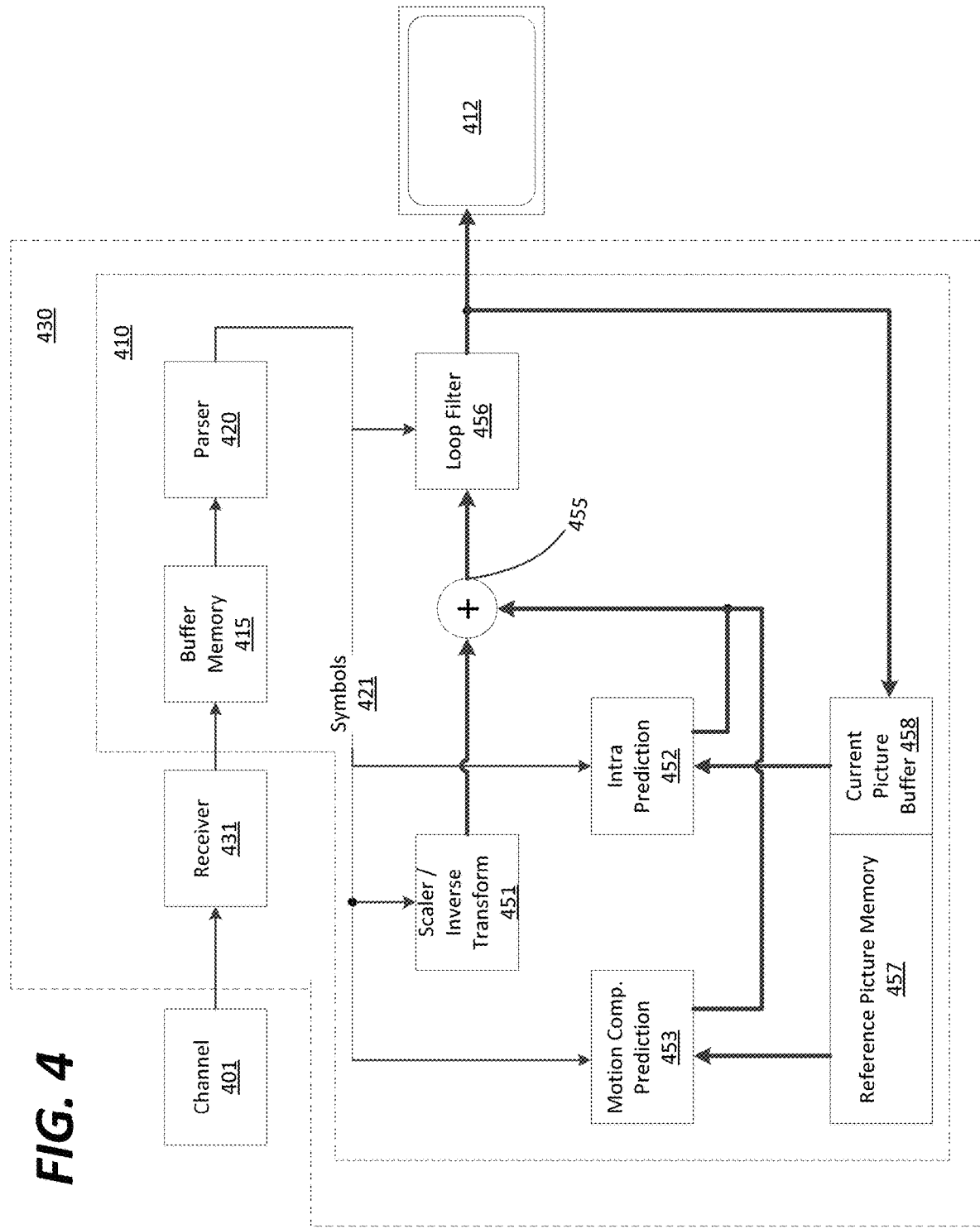
FIG. 4 is a schematic illustration of a simplified block diagram of a decoder in accordance with an embodiment.

FIG. 4 shows a block diagram of a video decoder (410) according to an embodiment of the present disclosure. The video decoder (410) can be included in an electronic device (430). The electronic device (430) can include a receiver (431) (e.g., receiving circuitry). The video decoder (410) can be used in the place of the video decoder (310) in the FIG. 3 example.

The receiver (431) may receive one or more coded video sequences to be decoded by the video decoder (410); in the same or another embodiment, one coded video sequence at a time, where the decoding of each coded video sequence is independent from other coded video sequences. The coded video sequence may be received from a channel (401), which may be a hardware/software link to a storage device which stores the encoded video data. The receiver (431) may receive the encoded video data with other data, for example, coded audio data and/or ancillary data streams, that may be forwarded to their respective using entities (not depicted). The receiver (431) may separate the coded video sequence from the other data. To combat network jitter, a buffer memory (415) may be coupled in between the receiver (431) and an entropy decoder/parser (420) ("parser (420)" henceforth). In certain applications, the buffer memory (415) is part of the video decoder (410). In others, it can be outside of the video decoder (410) (not depicted). In still others, there can be a buffer memory (not depicted) outside of the video decoder (410), for example to combat network jitter, and in addition another buffer memory (415) inside the video decoder (410), for example to handle playout timing. When the receiver (431) is receiving data from a store/forward device of sufficient bandwidth and controllability, or from an isosynchronous network, the buffer memory (415) may not be needed, or can be small. For use on best effort packet networks such as the Internet, the buffer memory (415) may be required, can be comparatively large and can be advantageously of adaptive size, and may at least partially be implemented in an operating system or similar elements (not depicted) outside of the video decoder (410).

The video decoder (410) may include the parser (420) to reconstruct symbols (421) from the coded video sequence. Categories of those symbols include information used to manage operation of the video decoder (410), and potentially information to control a rendering device such as a render device (412) (e.g., a display screen) that is not an integral part of the electronic device (430) but can be coupled to the electronic device (430), as was shown in FIG. 4. The control information for the rendering device(s) may be in the form of Supplemental Enhancement Information (SEI messages) or Video Usability Information (VUI) parameter set fragments (not depicted). The parser (420) may parse/entropy-decode the coded video sequence that is received. The coding of the coded video sequence can be in accordance with a video coding technology or standard, and can follow various principles, including variable length coding, Huffman coding, arithmetic coding with or without context sensitivity, and so forth. The parser (420) may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser (420) may also extract from the coded video sequence information such as transform coefficients, quantizer parameter values, motion vectors, and so forth.

The parser (420) may perform an entropy decoding/parsing operation on the video sequence received from the buffer memory (415), so as to create symbols (421).

Reconstruction of the symbols (421) can involve multiple different units depending on the type of the coded video picture or parts thereof (such as: inter and intra picture, inter and intra block), and other factors. Which units are involved, and how, can be controlled by the subgroup control information that was parsed from the coded video sequence by the parser (420). The flow of such subgroup control information between the parser (420) and the multiple units below is not depicted for clarity.

Beyond the functional blocks already mentioned, the video decoder (410) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (451). The scaler/inverse transform unit (451) receives a quantized transform coefficient as well as control information, including which transform to use, block size, quantization factor, quantization scaling matrices, etc. as symbol(s) (421) from the parser (420). The scaler/inverse transform unit (451) can output blocks comprising sample values that can be input into aggregator (455).

In some cases, the output samples of the scaler/inverse transform (451) can pertain to an intra coded block; that is: a block that is not using predictive information from previously reconstructed pictures, but can use predictive information from previously reconstructed parts of the current picture. Such predictive information can be provided by an intra picture prediction unit (452). In some cases, the intra picture prediction unit (452) generates a block of the same size and shape of the block under reconstruction, using surrounding already reconstructed information fetched from the current picture buffer (458). The current picture buffer (458) buffers, for example, partly reconstructed current picture and/or fully reconstructed current picture. The aggregator (455), in some cases, adds, on a per sample basis, the prediction information the intra prediction unit (452) has generated to the output sample information as provided by the scaler/inverse transform unit (451).

In other cases, the output samples of the scaler/inverse transform unit (451) can pertain to an inter coded, and potentially motion compensated block. In such a case, a motion compensation prediction unit (453) can access reference picture memory (457) to fetch samples used for prediction. After motion compensating the fetched samples in accordance with the symbols (421) pertaining to the block, these samples can be added by the aggregator (455) to the output of the scaler/inverse transform unit (451) (in this case called the residual samples or residual signal) so as to generate output sample information. The addresses within the reference picture memory (457) from where the motion compensation prediction unit (453) fetches prediction samples can be controlled by motion vectors, available to the motion compensation prediction unit (453) in the form of symbols (421) that can have, for example X, Y, and reference picture components. Motion compensation also can include interpolation of sample values as fetched from the reference picture memory (457) when sub-sample exact motion vectors are in use, motion vector prediction mechanisms, and so forth.

The output samples of the aggregator (455) can be subject to various loop filtering techniques in the loop filter unit (456). Video compression technologies can include in-loop filter technologies that are controlled by parameters included in the coded video sequence (also referred to as coded video bitstream) and made available to the loop filter unit (456) as symbols (421) from the parser (420), but can also be responsive to meta-information obtained during the decoding of previous (in decoding order) parts of the coded picture or coded video sequence, as well as responsive to previously reconstructed and loop-filtered sample values.

The output of the loop filter unit (456) can be a sample stream that can be output to the render device (412) as well as stored in the reference picture memory (457) for use in future inter-picture prediction.

Certain coded pictures, once fully reconstructed, can be used as reference pictures for future prediction. For example, once a coded picture corresponding to a current picture is fully reconstructed and the coded picture has been identified as a reference picture (by, for example, the parser (420)), the current picture buffer (458) can become a part of the reference picture memory (457), and a fresh current picture buffer can be reallocated before commencing the reconstruction of the following coded picture.

The video decoder (410) may perform decoding operations according to a predetermined video compression technology in a standard, such as ITU-T Rec. H.265. The coded video sequence may conform to a syntax specified by the video compression technology or standard being used, in the sense that the coded video sequence adheres to both the syntax of the video compression technology or standard and the profiles as documented in the video compression technology or standard. Specifically, a profile can select certain tools as the only tools available for use under that profile from all the tools available in the video compression technology or standard. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver (431) may receive additional (redundant) data with the encoded video. The additional data may be included as part of the coded video sequence(s). The additional data may be used by the video decoder (410) to properly decode the data and/or to more accurately reconstruct the original video data. Additional data can be in the form of, for example, temporal, spatial, or signal noise ratio (SNR) enhancement layers, redundant slices, redundant pictures, forward error correction codes, and so on.

Figure 5:
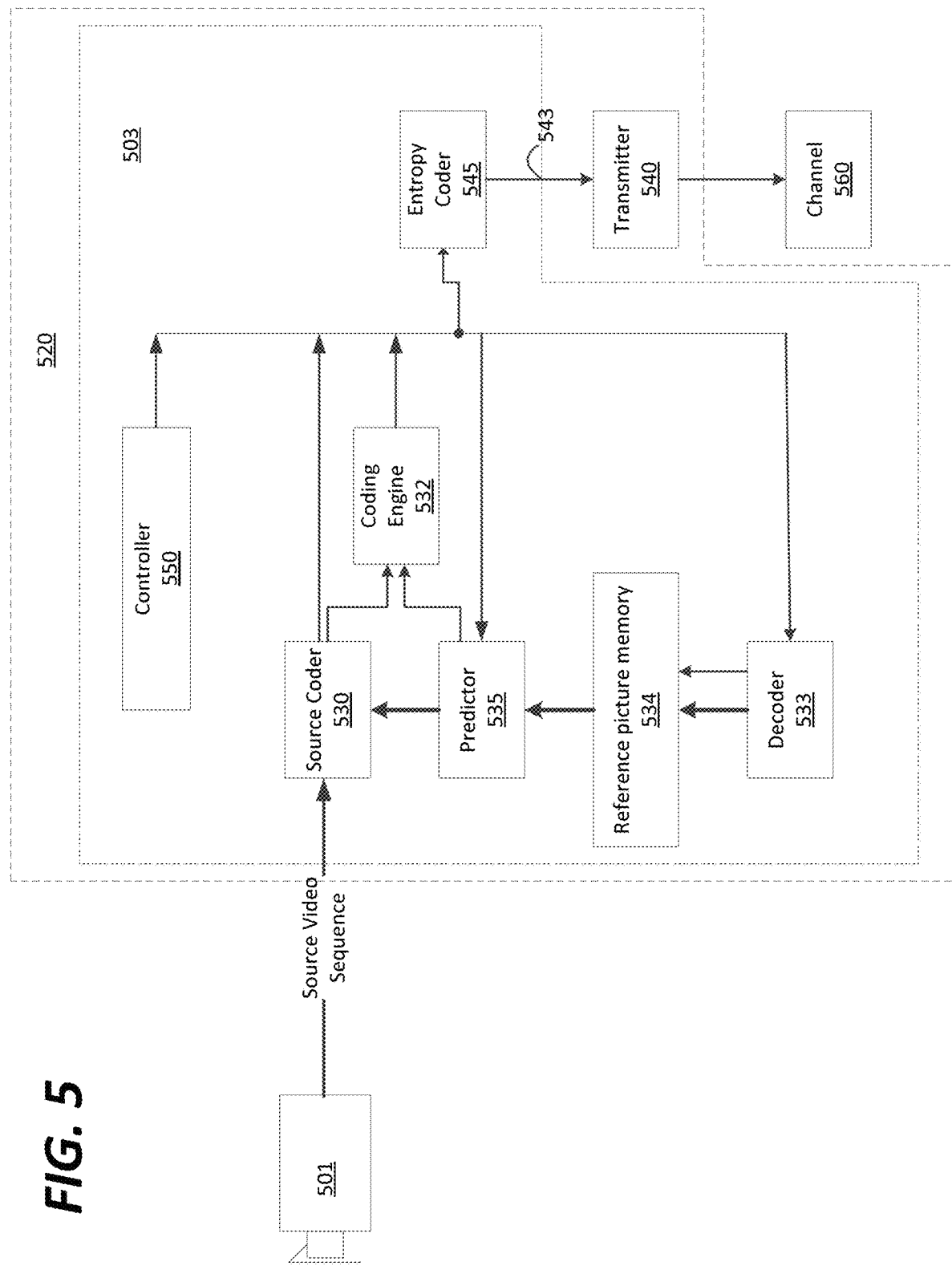
FIG. 5 is a schematic illustration of a simplified block diagram of an encoder in accordance with an embodiment.

FIG. 5 shows a block diagram of a video encoder (503) according to an embodiment of the present disclosure. The video encoder (503) is included in an electronic device (520). The electronic device (520) includes a transmitter (540) (e.g., transmitting circuitry). The video encoder (503) can be used in the place of the video encoder (303) in the FIG. 3 example.

The video encoder (503) may receive video samples from a video source (501) (that is not part of the electronic device (520) in the FIG. 5 example) that may capture video image(s) to be coded by the video encoder (503). In another example, the video source (501) is a part of the electronic device (520).

The video source (501) may provide the source video sequence to be coded by the video encoder (503) in the form of a digital video sample stream that can be of any suitable bit depth (for example: 8 bit, 10 bit, 12 bit, . . . ), any colorspace (for example, BT.601 Y CrCb, RGB, . . . ), and any suitable sampling structure (for example Y CrCb 4:2:0, Y CrCb 4:4:4). In a media serving system, the video source (501) may be a storage device storing previously prepared video. In a videoconferencing system, the video source (501) may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. A person skilled in the art can readily understand the relationship between pixels and samples. The description below focuses on samples.

According to an embodiment, the video encoder (503) may code and compress the pictures of the source video sequence into a coded video sequence (543) in real time or under any other time constraints as required by the application. Enforcing appropriate coding speed is one function of a controller (550). In some embodiments, the controller (550) controls other functional units as described below and is functionally coupled to the other functional units. The coupling is not depicted for clarity. Parameters set by the controller (550) can include rate control related parameters (picture skip, quantizer, lambda value of rate-distortion optimization techniques, . . . ), picture size, group of pictures (GOP) layout, maximum motion vector search range, and so forth. The controller (550) can be configured to have other suitable functions that pertain to the video encoder (503) optimized for a certain system design.

In some embodiments, the video encoder (503) is configured to operate in a coding loop. As an oversimplified description, in an example, the coding loop can include a source coder (530) (e.g., responsible for creating symbols, such as a symbol stream, based on an input picture to be coded, and a reference picture(s)), and a (local) decoder (533) embedded in the video encoder (503). The decoder (533) reconstructs the symbols to create the sample data in a similar manner as a (remote) decoder also would create (as any compression between symbols and coded video bitstream is lossless in the video compression technologies considered in the disclosed subject matter). The reconstructed sample stream (sample data) is input to the reference picture memory (534). As the decoding of a symbol stream leads to bit-exact results independent of decoder location (local or remote), the content in the reference picture memory (534) is also bit exact between the local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is used in some related arts as well.

The operation of the "local" decoder (533) can be the same as of a "remote" decoder, such as the video decoder (410), which has already been described in detail above in conjunction with FIG. 4. Briefly referring also to FIG. 4, however, as symbols are available and encoding/decoding of symbols to a coded video sequence by an entropy coder (545) and the parser (420) can be lossless, the entropy decoding parts of the video decoder (410), including the buffer memory (415) and the parser (420) may not be fully implemented in the local decoder (533).

An observation that can be made at this point is that any decoder technology except the parsing/entropy decoding that is present in a decoder also necessarily needs to be present, in substantially identical functional form, in a corresponding encoder. For this reason, the disclosed subject matter focuses on decoder operation. The description of encoder technologies can be abbreviated as they are the inverse of the comprehensively described decoder technologies. Only in certain areas a more detail description is required and provided below.

During operation, in some examples, the source coder (530) may perform motion compensated predictive coding, which codes an input picture predictively with reference to one or more previously-coded picture from the video sequence that were designated as "reference pictures". In this manner, the coding engine (532) codes differences between pixel blocks of an input picture and pixel blocks of reference picture(s) that may be selected as prediction reference(s) to the input picture.

The local video decoder (533) may decode coded video data of pictures that may be designated as reference pictures, based on symbols created by the source coder (530). Operations of the coding engine (532) may advantageously be lossy processes. When the coded video data may be decoded at a video decoder (not shown in FIG. 5), the reconstructed video sequence typically may be a replica of the source video sequence with some errors. The local video decoder (533) replicates decoding processes that may be performed by the video decoder on reference pictures and may cause reconstructed reference pictures to be stored in the reference picture cache (534). In this manner, the video encoder (503) may store copies of reconstructed reference pictures locally that have common content as the reconstructed reference pictures that will be obtained by a far-end video decoder (absent transmission errors).

The predictor (535) may perform prediction searches for the coding engine (532). That is, for a new picture to be coded, the predictor (535) may search the reference picture memory (534) for sample data (as candidate reference pixel blocks) or certain metadata such as reference picture motion vectors, block shapes, and so on, that may serve as an appropriate prediction reference for the new pictures. The predictor (535) may operate on a sample block-by-pixel block basis to find appropriate prediction references. In some cases, as determined by search results obtained by the predictor (535), an input picture may have prediction references drawn from multiple reference pictures stored in the reference picture memory (534).

The controller (550) may manage coding operations of the source coder (530), including, for example, setting of parameters and subgroup parameters used for encoding the video data.

Output of all aforementioned functional units may be subjected to entropy coding in the entropy coder (545). The entropy coder (545) translates the symbols as generated by the various functional units into a coded video sequence, by lossless compressing the symbols according to technologies such as Huffman coding, variable length coding, arithmetic coding, and so forth.

The transmitter (540) may buffer the coded video sequence(s) as created by the entropy coder (545) to prepare for transmission via a communication channel (560), which may be a hardware/software link to a storage device which would store the encoded video data. The transmitter (540) may merge coded video data from the video coder (503) with other data to be transmitted, for example, coded audio data and/or ancillary data streams (sources not shown).

The controller (550) may manage operation of the video encoder (503). During coding, the controller (550) may assign to each coded picture a certain coded picture type, which may affect the coding techniques that may be applied to the respective picture. For example, pictures often may be assigned as one of the following picture types:

An Intra Picture (I picture) may be one that may be coded and decoded without using any other picture in the sequence as a source of prediction. Some video codecs allow for different types of intra pictures, including, for example Independent Decoder Refresh ("IDR") Pictures. A person skilled in the art is aware of those variants of I pictures and their respective applications and features.

A predictive picture (P picture) may be one that may be coded and decoded using intra prediction or inter prediction using at most one motion vector and reference index to predict the sample values of each block.

A bi-directionally predictive picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded predictively, via spatial prediction or via temporal prediction with reference to one previously coded reference picture. Blocks of B pictures may be coded predictively, via spatial prediction or via temporal prediction with reference to one or two previously coded reference pictures.

The video encoder (503) may perform coding operations according to a predetermined video coding technology or standard, such as ITU-T Rec. H.265. During operation, the video encoder (503) may perform various compression operations, including predictive coding operations that exploit temporal and spatial redundancies in the input video sequence. The coded video data, therefore, may conform to a syntax specified by the video coding technology or standard being used.

In an embodiment, the transmitter (540) may transmit additional data with the encoded video. The source coder (530) may include such data as part of the coded video sequence. Additional data may comprise temporal/spatial/SNR enhancement layers, other forms of redundant data such as redundant pictures and slices, SEI messages, VUI parameter set fragments, and so on.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

In some embodiments, a bi-prediction technique can be used in the inter-picture prediction. According to the bi-prediction technique, two reference pictures, such as a first reference picture and a second reference picture that are both prior in decoding order to the current picture in the video (but may be in the past and future, respectively, in display order) are used. A block in the current picture can be coded by a first motion vector that points to a first reference block in the first reference picture, and a second motion vector that points to a second reference block in the second reference picture. The block can be predicted by a combination of the first reference block and the second reference block.

Further, a merge mode technique can be used in the inter-picture prediction to improve coding efficiency.

According to some embodiments of the disclosure, predictions, such as inter-picture predictions and intra-picture predictions are performed in the unit of blocks. For example, according to the HEVC standard, a picture in a sequence of video pictures is partitioned into coding tree units (CTU) for compression, the CTUs in a picture have the same size, such as 64×64 pixels, 32×32 pixels, or 16×16 pixels. In general, a CTU includes three coding tree blocks (CTBs), which are one luma CTB and two chroma CTBs. Each CTU can be recursively quadtree split into one or multiple coding units (CUs). For example, a CTU of 64×64 pixels can be split into one CU of 64×64 pixels, or 4 CUs of 32×32 pixels, or 16 CUs of 16×16 pixels. In an example, each CU is analyzed to determine a prediction type for the CU, such as an inter prediction type or an intra prediction type. The CU is split into one or more prediction units (PUs) depending on the temporal and/or spatial predictability. Generally, each PU includes a luma prediction block (PB), and two chroma PBs. In an embodiment, a prediction operation in coding (encoding/decoding) is performed in the unit of a prediction block. Using a luma prediction block as an example of a prediction block, the prediction block includes a matrix of values (e.g., luma values) for pixels, such as 8×8 pixels, 16×16 pixels, 8×16 pixels, 16×8 pixels, and the like.

Figure 6:
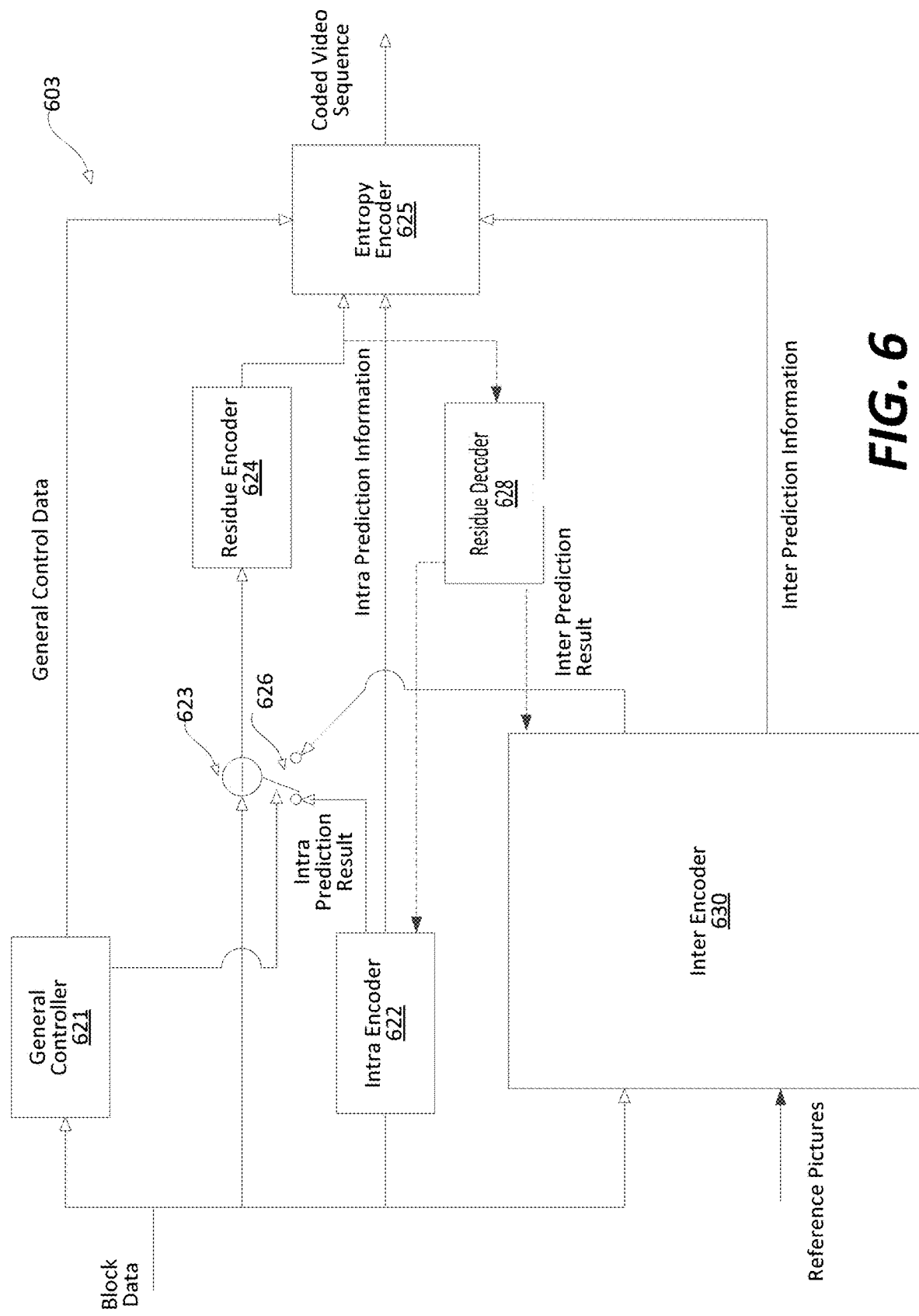
FIG. 6 shows a block diagram of an encoder in accordance with another embodiment.

FIG. 6 shows a diagram of a video encoder (603) according to another embodiment of the disclosure. The video encoder (603) is configured to receive a processing block (e.g., a prediction block) of sample values within a current video picture in a sequence of video pictures, and encode the processing block into a coded picture that is part of a coded video sequence. In an example, the video encoder (603) is used in the place of the video encoder (303) in the FIG. 3 example.

In an HEVC example, the video encoder (603) receives a matrix of sample values for a processing block, such as a prediction block of 8×8 samples, and the like. The video encoder (603) determines whether the processing block is best coded using intra mode, inter mode, or bi-prediction mode using, for example, rate-distortion optimization. When the processing block is to be coded in intra mode, the video encoder (603) may use an intra prediction technique to encode the processing block into the coded picture; and when the processing block is to be coded in inter mode or bi-prediction mode, the video encoder (603) may use an inter prediction or bi-prediction technique, respectively, to encode the processing block into the coded picture. In certain video coding technologies, merge mode can be an inter picture prediction submode where the motion vector is derived from one or more motion vector predictors without the benefit of a coded motion vector component outside the predictors. In certain other video coding technologies, a motion vector component applicable to the subject block may be present. In an example, the video encoder (603) includes other components, such as a mode decision module (not shown) to determine the mode of the processing blocks.

In the FIG. 6 example, the video encoder (603) includes the inter encoder (630), an intra encoder (622), a residue calculator (623), a switch (626), a residue encoder (624), a general controller (621), and an entropy encoder (625) coupled together as shown in FIG. 6.

The inter encoder (630) is configured to receive the samples of the current block (e.g., a processing block), compare the block to one or more reference blocks in reference pictures (e.g., blocks in previous pictures and later pictures), generate inter prediction information (e.g., description of redundant information according to inter encoding technique, motion vectors, merge mode information), and calculate inter prediction results (e.g., predicted block) based on the inter prediction information using any suitable technique. In some examples, the reference pictures are decoded reference pictures that are decoded based on the encoded video information.

The intra encoder (622) is configured to receive the samples of the current block (e.g., a processing block), in some cases compare the block to blocks already coded in the same picture, generate quantized coefficients after transform, and in some cases also intra prediction information (e.g., an intra prediction direction information according to one or more intra encoding techniques). In an example, the intra encoder (622) also calculates intra prediction results (e.g., predicted block) based on the intra prediction information and reference blocks in the same picture.

The general controller (621) is configured to determine general control data and control other components of the video encoder (603) based on the general control data. In an example, the general controller (621) determines the mode of the block, and provides a control signal to the switch (626) based on the mode. For example, when the mode is the intra mode, the general controller (621) controls the switch (626) to select the intra mode result for use by the residue calculator (623), and controls the entropy encoder (625) to select the intra prediction information and include the intra prediction information in the bitstream; and when the mode is the inter mode, the general controller (621) controls the switch (626) to select the inter prediction result for use by the residue calculator (623), and controls the entropy encoder (625) to select the inter prediction information and include the inter prediction information in the bitstream.

The residue calculator (623) is configured to calculate a difference (residue data) between the received block and prediction results selected from the intra encoder (622) or the inter encoder (630). The residue encoder (624) is configured to operate based on the residue data to encode the residue data to generate the transform coefficients. In an example, the residue encoder (624) is configured to convert the residue data from a spatial domain to a frequency domain, and generate the transform coefficients. The transform coefficients are then subject to quantization processing to obtain quantized transform coefficients. In various embodiments, the video encoder (603) also includes a residue decoder (628). The residue decoder (628) is configured to perform inverse-transform, and generate the decoded residue data. The decoded residue data can be suitably used by the intra encoder (622) and the inter encoder (630). For example, the inter encoder (630) can generate decoded blocks based on the decoded residue data and inter prediction information, and the intra encoder (622) can generate decoded blocks based on the decoded residue data and the intra prediction information. The decoded blocks are suitably processed to generate decoded pictures and the decoded pictures can be buffered in a memory circuit (not shown) and used as reference pictures in some examples.

The entropy encoder (625) is configured to format the bitstream to include the encoded block. The entropy encoder (625) is configured to include various information according to a suitable standard, such as the HEVC standard. In an example, the entropy encoder (625) is configured to include the general control data, the selected prediction information (e.g., intra prediction information or inter prediction information), the residue information, and other suitable information in the bitstream. Note that, according to the disclosed subject matter, when coding a block in the merge submode of either inter mode or bi-prediction mode, there is no residue information.

Figure 7:
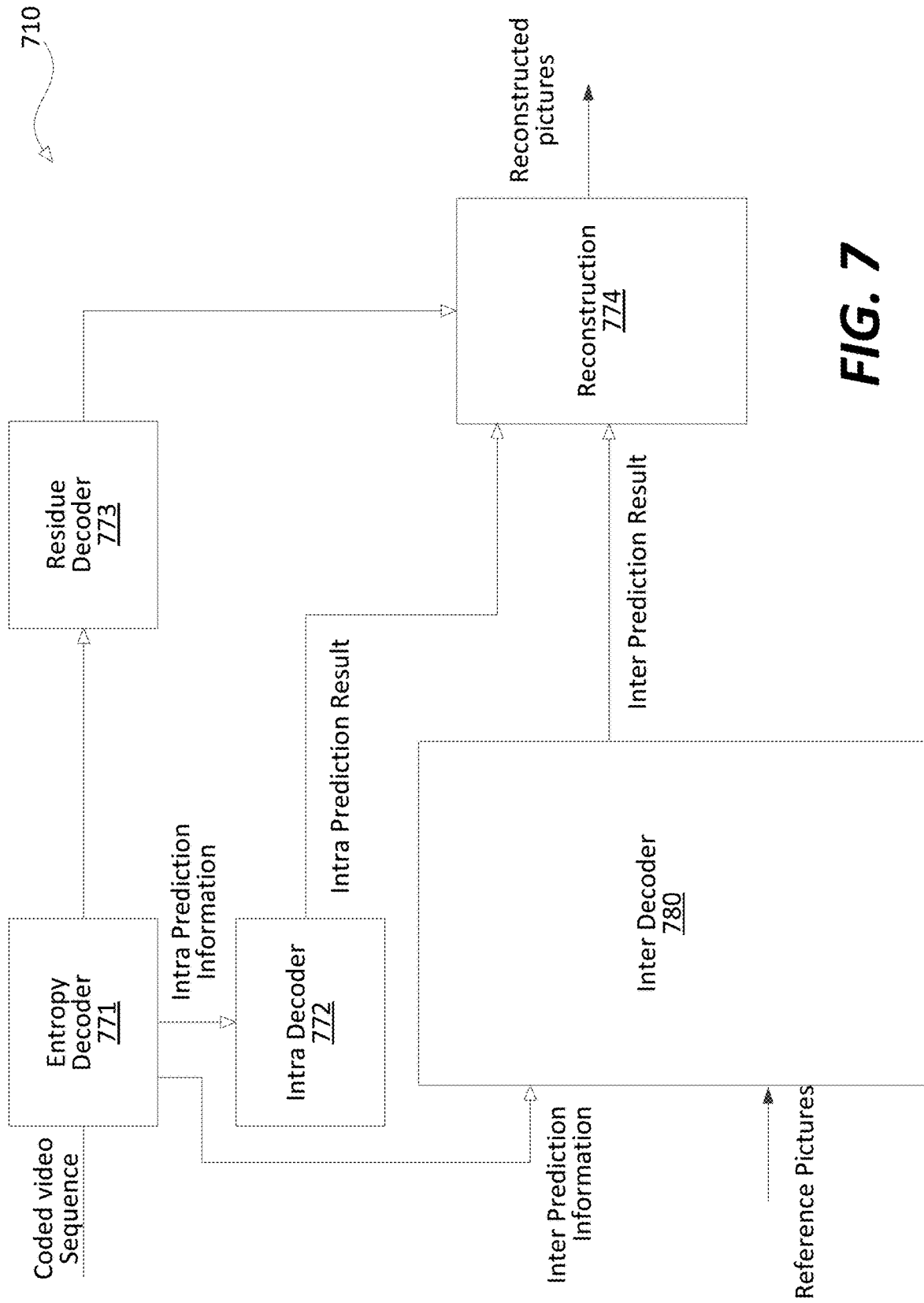
FIG. 7 shows a block diagram of a decoder in accordance with another embodiment.

FIG. 7 shows a diagram of a video decoder (710) according to another embodiment of the disclosure. The video decoder (710) is configured to receive coded pictures that are part of a coded video sequence, and decode the coded pictures to generate reconstructed pictures. In an example, the video decoder (710) is used in the place of the video decoder (310) in the FIG. 3 example.

In the FIG. 7 example, the video decoder (710) includes an entropy decoder (771), an inter decoder (780), a residue decoder (773), a reconstruction module (774), and an intra decoder (772) coupled together as shown in FIG. 7.

The entropy decoder (771) can be configured to reconstruct, from the coded picture, certain symbols that represent the syntax elements of which the coded picture is made up. Such symbols can include, for example, the mode in which a block is coded (such as, for example, intra mode, inter mode, bi-predicted mode, the latter two in merge submode or another submode), prediction information (such as, for example, intra prediction information or inter prediction information) that can identify certain sample or metadata that is used for prediction by the intra decoder (772) or the inter decoder (780), respectively, residual information in the form of, for example, quantized transform coefficients, and the like. In an example, when the prediction mode is inter or bi-predicted mode, the inter prediction information is provided to the inter decoder (780); and when the prediction type is the intra prediction type, the intra prediction information is provided to the intra decoder (772). The residual information can be subject to inverse quantization and is provided to the residue decoder (773).

The inter decoder (780) is configured to receive the inter prediction information, and generate inter prediction results based on the inter prediction information.

The intra decoder (772) is configured to receive the intra prediction information, and generate prediction results based on the intra prediction information.

The residue decoder (773) is configured to perform inverse quantization to extract de-quantized transform coefficients, and process the de-quantized transform coefficients to convert the residual from the frequency domain to the spatial domain. The residue decoder (773) may also require certain control information (to include the Quantizer Parameter (QP)), and that information may be provided by the entropy decoder (771) (data path not depicted as this may be low volume control information only).

The reconstruction module (774) is configured to combine, in the spatial domain, the residual as output by the residue decoder (773) and the prediction results (as output by the inter or intra prediction modules as the case may be) to form a reconstructed block, that may be part of the reconstructed picture, which in turn may be part of the reconstructed video. It is noted that other suitable operations, such as a deblocking operation and the like, can be performed to improve the visual quality.

It is noted that the video encoders (303), (503), and (603), and the video decoders (310), (410), and (710) can be implemented using any suitable technique. In an embodiment, the video encoders (303), (503), and (603), and the video decoders (310), (410), and (710) can be implemented using one or more integrated circuits. In another embodiment, the video encoders (303), (503), and (503), and the video decoders (310), (410), and (710) can be implemented using one or more processors that execute software instructions.

In general, motion compensation can be performed at a block level. That is to say, a block is a processing unit for performing motion compensation and all pixels in the block uses same motion information to perform motion compensation.

Figure 8A:
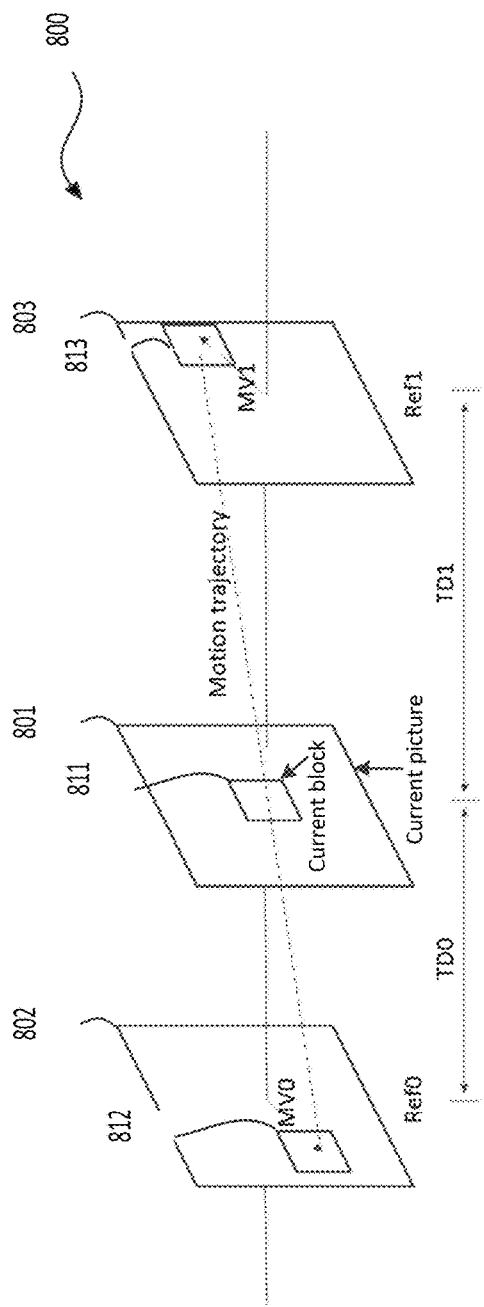
FIG. 8A shows a block level motion compensation method, referred to as bilateral matching, according to an embodiment of the disclosure.

FIG. 8A shows a block level motion compensation method, referred to as bilateral matching (800), according to an embodiment of the disclosure. The bilateral matching (800) is used to derive motion information of a current block (811) in a current picture (801) by finding the closet match between two blocks along the motion trajectory of the current block (801) in two different reference pictures Ref0 (802) and Ref1 (803). Under the assumption of continuous motion trajectory, motion vectors MV0 and MV1 pointing to the two reference blocks (812) and (813) can be proportional to the temporal distances, i.e., TD0 and TD1, between the current picture (801) and the two reference pictures (802) and (803). In some embodiments, when the current picture (801) is temporally between the two reference pictures (802) and (803) and the temporal distances from the current picture to the two reference pictures are the same (i.e., TD0=TD1), the bilateral matching becomes mirror-based bi-directional motion vector prediction.

Figure 8B:
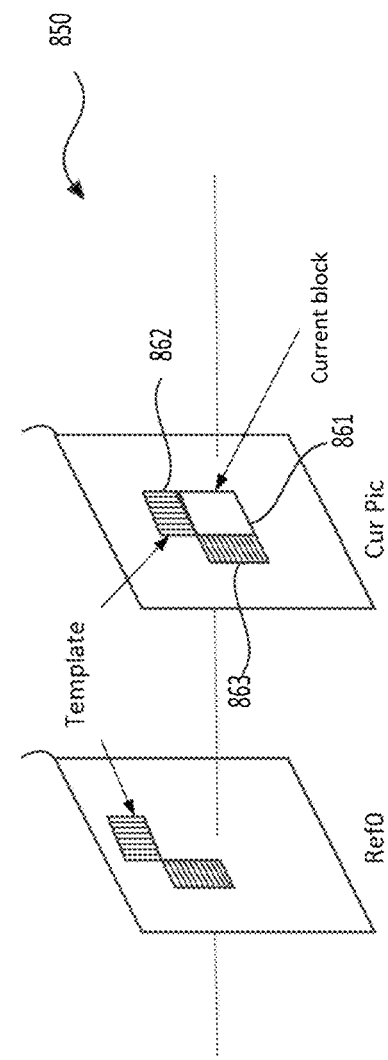
FIG. 8B shows another block level motion compensation method, referred to as template matching, according to an embodiment of the disclosure.

FIG. 8B shows another block level motion compensation method, referred to as template matching (850), according to an embodiment of the disclosure. The template matching (850) is used to derive motion information of a current block (861) in a current picture (851) by finding the closet match between a template, such as top neighboring blocks (862) and/or left neighboring blocks (863) of the current block (861) in the current picture (851), and a block with same size to the template in a reference picture (852).

In some cases, pixels at different positions inside a block can have different motion information to perform motion compensation. Such motion compensation methods are referred to as sub-block level motion compensation methods, in which an actual processing unit of motion compensation of a block can be smaller than the block itself. In other words, the block can be partitioned into multiple sub-blocks, each of which may use different motion information, such as different motion vectors, to perform motion compensation. In an example, the block can be partitioned into M×N sub-blocks where M is the number of rows and N is the number of columns.

Figure 9:
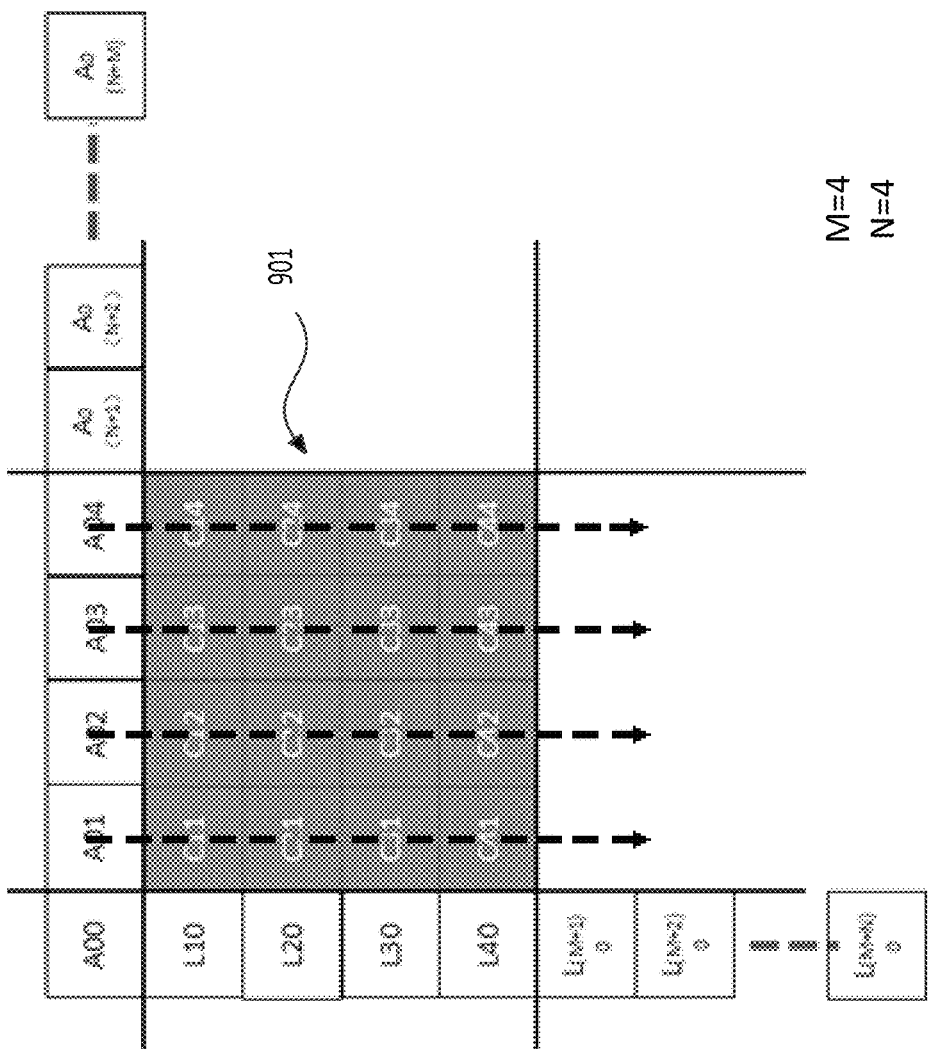
FIG. 9 shows a directional sub-block level motion vector prediction method according to an embodiment of the disclosure.

FIG. 9 shows a directional sub-block level motion vector prediction method according to an embodiment of the disclosure. In the directional sub-block level motion vector prediction mode, for a given direction, a sub-block in a current block uses motion information of neighboring reference block of the sub-block to predict a motion vector of the sub-block. FIG. 9 shows such a motion vector prediction with vertical direction. In example illustrated in FIG. 9, a current block (901) is partitioned into 4×4 (M=4 and N=4) sub-blocks C11~C44, and above neighbors of the current block (901) are sub-blocks A01~A04 which can be used as reference blocks of the current block (901). In this prediction method, C11~C14, C21~C24, C31~C34, and C41~C44 are predicted from their above neighboring sub-blocks A01, A02, A03, and A04, respectively. For example, C21~C24 are predicted by their above neighboring sub-block A02.

Some of sub-block level motion vector prediction methods may be based on the availability of surrounding neighboring blocks and their motion information. For such motion vector prediction methods, if any of these neighbors are not available, or do not exist (such as picture boundary or slice boundary), or are not yet coded, or do not have a set of valid motion information (such as not coded in inter mode), motion compensation of a current block will not work properly. In order to make such sub-block level motion vector prediction methods work in more conditions, methods to generate useful and significantly advantageous motion information from the surrounding neighboring blocks will be described below.

According to some embodiments, for a sub-block in a current block, a reference picture that associates a motion vector predictor of the sub-block can be different from a reference picture that associates a motion vector predictor of another sub-block in the current block. In addition, a common reference picture (or a pair of common reference pictures in a bi-directional prediction case, referred to as picture pair) is used for predicting the current block. Accordingly, a scaling process is performed such that motion vectors of the sub-blocks in the current block are scaled to point to the common reference picture (or picture pair). In addition, all motion vector predictors from neighboring sub-blocks are scaled to the common reference picture (or picture pair) for the current block.

In one embodiment, a first reference picture in List 0 is selected as the common reference picture for the current block. In addition, in a bi-directional prediction case, a second reference picture in List 1 may be selected together with the first reference picture as a pair of common reference pictures.

In one embodiment, a high-level flag (such as in slice header, picture parameter set, or sequence parameter set) is used to indicate which reference picture (or picture pair) is the common reference picture (or picture pair) for the scaling process.

In one embodiment, a co-located picture (or picture pair) specified to derive a temporal motion vector predictor (TMVP) for the current block is used as the common reference picture (or picture pair).

In a bi-directional predication case, a sub-block is usually predicted with two motion vectors. In one embodiment, these two motion vector are predicted by different lists of common reference picture, and if only one common reference picture is specified, the motion vector predicted by the unspecified common reference picture in the different list may be discarded while the motion vector predicted by the specified common reference picture is kept.

According to some embodiments, for a current block with at least one top neighboring reference sub-block, if motion information of one of the at least one top neighboring reference sub-block is not available, a neighboring sub-block of the one of the at least one top neighboring reference sub-block will be used to replace the one of the at least one sub-block as a top neighboring reference sub-block of the current block.

Referring to the FIG. 9 example, a sub-block A0X (X=1, 2, 3, or 4) is a top neighboring reference sub-block of the current block (901). Some neighboring sub-blocks of the sub-block A0X are a left neighboring sub-block A0(X−1), a right neighboring sub-block A0(X+1), and an above neighboring sub-block A(−1)X where (−1) represents an above position of the sub-block A0X.

In an embodiment, if motion information of the sub-block A0X is not available but motion information of a neighboring sub-block of the sub-block A0X is available, the neighboring sub-block of the sub-block A0X can be used to replace the sub-block A0X as a top neighboring reference sub-block of the current block (901). In an example, if motion information of the left neighboring sub-block A0(X−1) of the sub-block A0X is available, then the sub-block A0(X−1) can replace the sub-block A0X as a top neighboring reference sub-block of the current block (901). In another example, if motion information of the right neighboring sub-block A0(X+1) of the sub-block A0X is available, then the sub-block A0(X+1) can replace the sub-block A0(X) as a top neighboring reference sub-block of the current block (901). In a third example, if motion information of the top neighboring sub-block A(−1)X of the sub-block A0X is available, then the sub-block A(−1)X can replace the sub-block A0(X) as a top neighboring reference sub-block of the current block (901).

In a fourth example, the motion information of the sub-blocks A0(X−1), A0(X+1), and A(−1)X may be weighted combined and used as the motion information for the sub-block A0X. The weights can depend on the availability of the motion information of these neighboring sub-blocks. For example, the weights can spread equally among sub-blocks with available motion information. In addition, a motion vector of a sub-block A00 may be used in some examples in which the motion information of the reference sub-block A0X is not available.

According to some embodiments, for a current block with at least one left neighboring reference sub-block, if motion information of one of the at least one left neighboring reference sub-block is not available, a neighboring sub-block of the one of the at least one left neighboring reference sub-block will be used to replace the one of the at least one sub-block as a left neighboring reference sub-block of the current block.

Still referring to the FIG. 9 example, a sub-block LX0 (X=1, 2, 3, or 4) is a left neighboring reference sub-block of the current block (901). Some neighboring sub-blocks of the sub-block LX0 are an above neighboring sub-block L(X−1)0, a bottom neighboring sub-block L(X+1)0, and a left neighboring sub-block LX(−1) where −1 represents a left position of the sub-block LX0.

In an embodiment, if motion information of the sub-block LX0 is not available but motion information of a neighboring sub-block of the sub-block LX0 is available, the neighboring sub-block of the sub-block LX0 can be used to replace the sub-block LX0 as a left neighboring reference sub-block of the current block (901). In an example, if motion information of the above neighboring sub-block L(X−1)0 of the sub-block LX0 is available, then the sub-block L(X−1)0 can replace the sub-block LX0 as a left neighboring reference sub-block of the current block (901). In another example, if motion information of the bottom neighboring sub-block L(X+1)0 of the sub-block LX0 is available, then the sub-block L(X+1)0 can replace the sub-block L(X)0 as a left neighboring reference sub-block of the current block (901). In a third example, if motion information of the left neighboring sub-block LX(−1) of the sub-block LX0 is available, then the sub-block LX(−1) can replace the sub-block L(X)0 as a left neighboring reference sub-block of the current block (901). In a fourth example, the motion information of the sub-blocks L(X−1)0, L(X+1)0, and LX(−1) may be weighted combined and used as the motion information for the sub-block LX0. The weights can depend on the availability of the motion information of these neighboring sub-blocks. For example, the weights can spread equally among sub-blocks with available motion information. In addition, a motion vector of a sub-block A00 may be used in some examples in which the motion information of the reference sub-block LX0 is not available.

According to some embodiments, the order to check availability of motion information of a neighboring sub-block can be from a most-left neighboring sub-block to a most-right neighboring sub-block for a top neighboring reference sub-block of a current block, or vice versa. Referring to the example illustrated in FIG. 9, in one embodiment, for top neighboring reference sub-blocks (A01~A04) of the current block (901), motion information of the sub-block A00 may be first checked, then sub-blocks A01, A02, and so on, until availabilities of motion information of all necessary sub-blocks are checked. In another embodiment, motion information of the sub-block A0(N+1) (N=4 in the FIG. 9 example) may be first checked, then sub-blocks A0(N), A0(N−1), and so on, until availabilities of motion information of all necessary sub-blocks are checked.

According to some embodiments, the order to check availability of motion information of a neighboring sub-block can be from a most-above neighboring sub-block to a most-bottom neighboring sub-block for a left neighboring reference sub-block of a current block, or vice versa. Still referring to the FIG. 9 example, in one embodiment, for left neighboring reference sub-blocks (L10~L40) of the current block (901), motion information of the sub-block A00 may be first checked, then sub-blocks L10, L20, and so on, until availabilities of motion information of all necessary sub-blocks are checked. In another embodiment, motion information of the sub-block L(M+1)0 (M=4 in the FIG. 9 example) may be first checked, then sub-blocks L(M)0, L(M−1)0, and so on, until availabilities of motion information of all necessary sub-blocks are checked.

Figure 10:
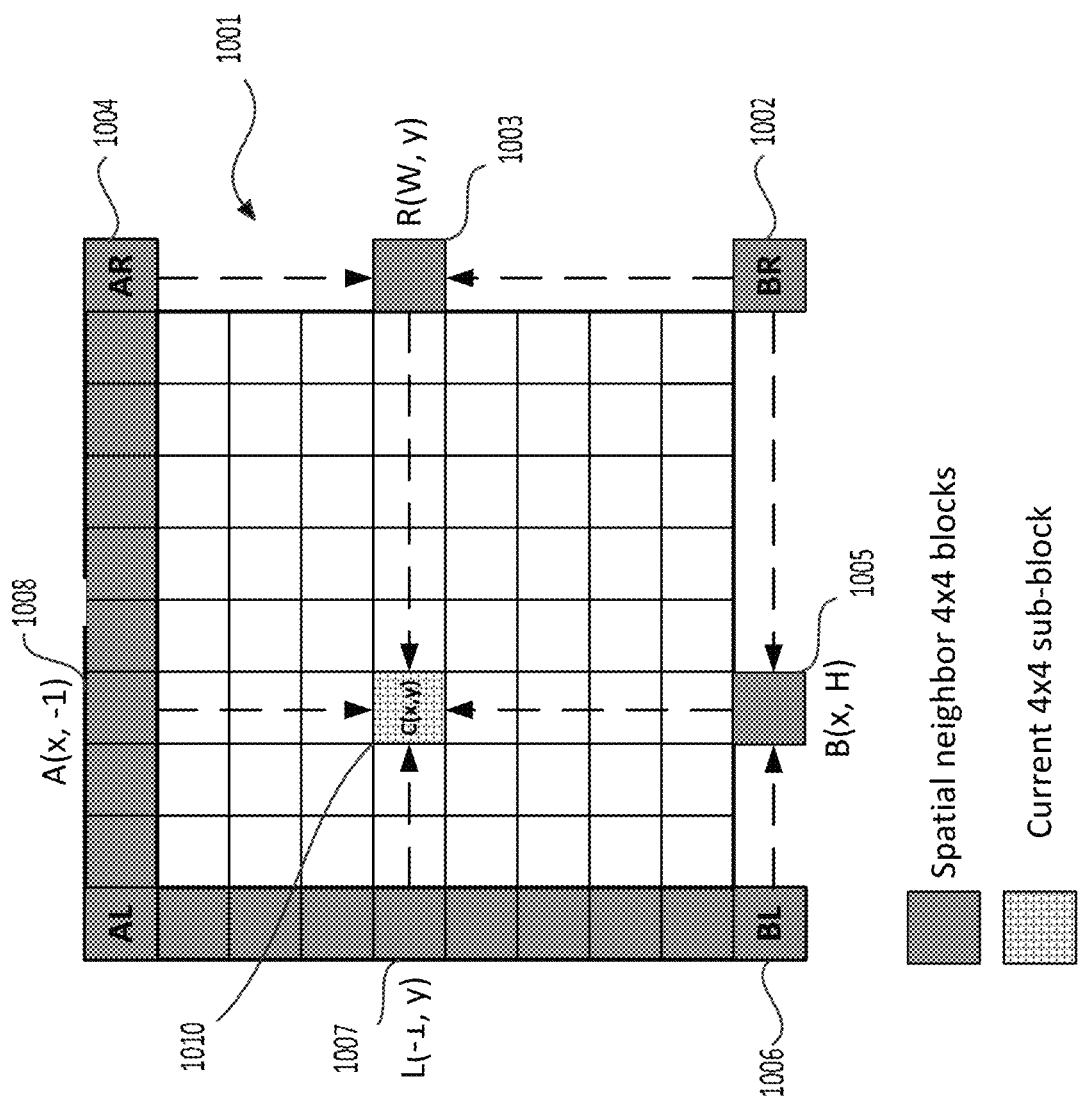
FIG. 10 shows an exemplary planar motion prediction method according to an embodiment of the disclosure.

FIG. 10 shows an exemplary planar motion prediction method according to an embodiment of the disclosure. In the planar motion prediction method, a motion vector of each sub-block is derived in a similar fashion of planar intra prediction mode.

At first, a motion vector of a bottom-right (BR) corner sub-block (1002) (referred to as BR sub-block unless otherwise stated) outside a current block (1001) is predicted by using a temporal motion vector predictor (TMVP) of a co-located sub-block of the BR sub-block (1002) in a co-located reference picture.

Secondly, a motion vector of an outer right column sub-block R(W, y) (1003) is generated using a weighted average of the motion vectors of the BR sub-block (1002) and an above-right (AR) corner sub-block (1004) (referred to as AR sub-block) outside the current block (1001). Similarly, a motion vector of an outer bottom row sub-block B(x, H) (1005) is generated using a weighted average of the motion vectors of the BR sub-block (1002) and a bottom-left (BL) corner sub-block (1006) (referred to as BL sub-block) outside the current block (1001).

After the motion vector for sub-block B(x, H) is generated, a motion vector prediction of a current sub-block C(x, y) (1010) of the current block (1001) are formed by two motion vector predictors. One motion vector predictor is a horizontal predictor formed by using a weighted average of motion vectors of the sub-block R(W, y) (1003) and an outer left column sub-block L(−1, y) (1007). The other motion vector predictor is a vertical predictor formed by using a weighted average of motion vectors of the sub-block B(x, H) (1005) and an outer above row sub-block A(x, −1) (1008). The motion vector prediction of the current sub-block C(x, y) (1010) is subsequently formed by a weighted average of the horizontal predictor and the vertical predictor.

Although weights from neighboring motion vectors may be different in different planar motion vector prediction methods, the use of motion information of a BR sub-block of the current block is common in the methods performing motion vector prediction according to the motion information of the BR sub-block of the current block. In this regard, once the motion information of the BR sub-block is determined, the predictors of other sub-blocks of the current block can be determined given a planar motion vector prediction method. Accordingly, when using a planar motion vector prediction method to construct a current block, some methods are described in the following paragraphs to determine, in response to the use of the planar motion vector prediction mode, at least one temporal motion vector predictor (TMVP) candidate for a bottom-right (BR) corner of the current block.

Figure 11:
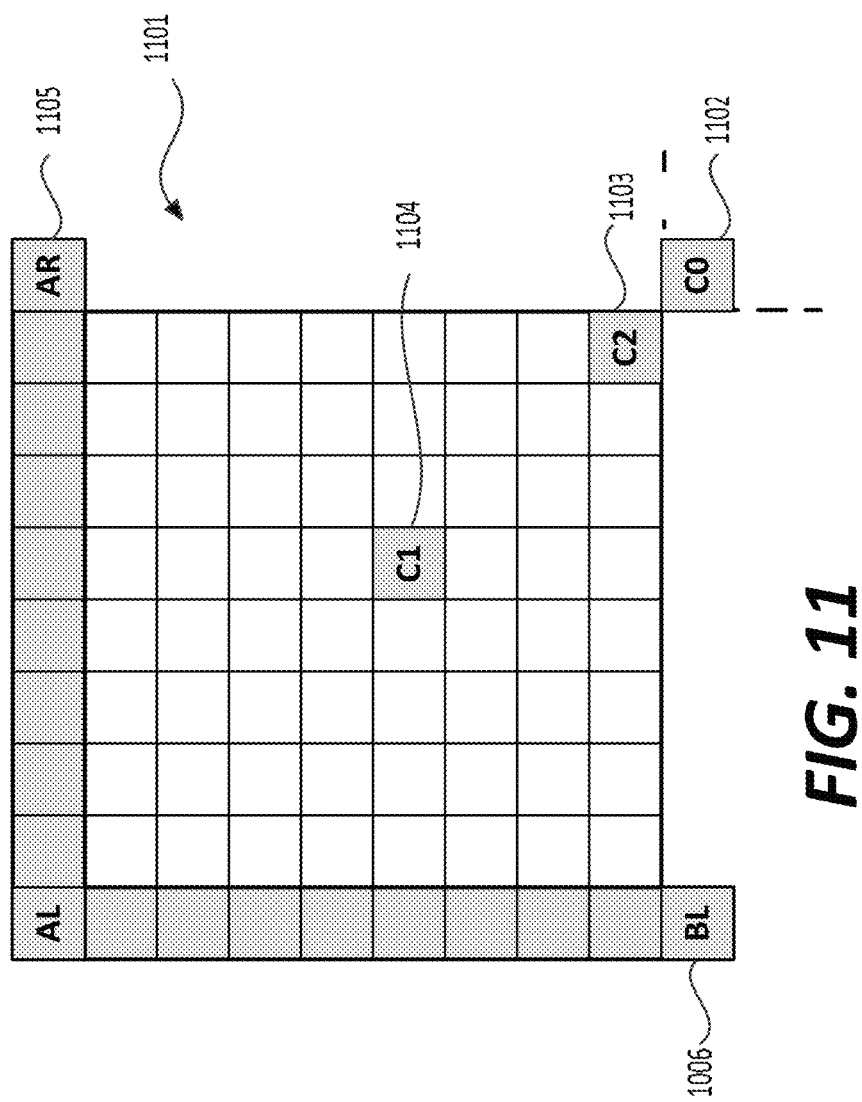
FIG. 11 shows an exemplary diagram to determine a temporal motion vector predictor of a bottom-right sub-block of a current block from different locations of the current block, according to an embodiment of the disclosure.

FIG. 11 shows an exemplary diagram to determine a TMVP of a BR sub-block of a current block (1101) from different locations of the current block (1101), according to an embodiment of the disclosure. A BR sub-block C0 (1102) is located at a bottom-right corner outside of the current block (1101). It is noted that the BR corner position can also be at the C2 position, which is inside the current block (1101). When a sub-block C2 (1103) is chosen as the BR sub-block, AR and BL sub-blocks (1105) and (1106) can optionally move inward for one sub-block. In other words, the AR sub-block (1105) is moved left a sub-block distance and the BL sub-block (1106) is moved up a sub-block distance. The rest of sub-block based planar motion vector derivation can be performed accordingly. For example, outer right column locations of the current block (1101) will then become the right-most column locations of the current block (1101). Accordingly, for a simplified description, a BR corner is used in the following paragraphs to indicate one of the BR sub-blocks C0 (1102) and C2 (1103) unless otherwise stated.

In one embodiment, the TMVP of the BR corner can be determined by using a co-located block of the BR sub block in a reference picture. The co-located block in the reference picture is in a same location as the BR corner in the current coded picture. In addition, a motion vector difference (MVD) is signaled so that final motion vector of the BR corner can be formed by adding the signaled MVD to the TMVP. Once the final motion vector of the BR corner is decided, a motion vector of each sub-block of the current block (1101) can be derived using a planar motion vector prediction method.

In another embodiment, more than one possible TMVP are used to form a candidate list for predicting the motion vector of the BR corner. An index of the candidate list is signaled to choose the motion vector predictor for the BR corner. In addition, a MVD can be signaled so that a final motion vector of the BR corner can be formed by adding the signaled MVD to the selected TMVP identified by the index.

To form the candidate list, some possible TMVPs are described below.

In an example, one possible TMVP can be formed by using a co-located block of a sub-block C1 (1104) (in the co-located picture) which is at a BR position adjacent to a center location of the current block (1101).

In another example, one possible TMVP can be formed by using a co-located block of the sub-block C2 (1103) (in the co-located picture) which is at BR corner inside of the current block (1101).

In other examples, the other possible TMVPs for the BR corner can be formed by using TMVPs of sub-blocks at other locations related to the current block (1101), for example, sub-blocks C1 (1104), AR (1105), and BR (1106), if the motion information of these sub-blocks are available.

Furthermore, in some embodiments, a weighted average of motion vectors of the sub-blocks at AR (1105) and BL (1106) locations of the current block (1101) can be used as a motion vector predictor for the BR corner, if at least one of the motion vectors of the sub-blocks at AR (1105) and BL (1106) locations is available. If one motion vector is not available, an available one can be used as the predictor for the BR corner. If both are available, but at least one of reference pictures of two sub-blocks AR (1105) and BL (1106) is different from a reference picture that is used for predicting the current block (1101), a scaling process is performed so that the motion vector(s) with different reference picture is scaled to the reference picture of the current block before using it (or them) as a motion vector predictor. If a current slice is a B slice with reference pictures from both lists, an estimated motion vector predictor for the BR corner can be a starting point to perform bilateral search or decoder-side motion vector refinement search. The output from such search can be used as a final motion vector predictor for the BR corner.

It is noted that the MVD can be always 0 so it is not signaled in above examples. In addition, a candidate order of the candidate list can be predetermined. For example, the candidate order can be predetermined by the positions of the sub-blocks. In such a case, an availability of a TMVP of the sub-block C0 (1102) may be first checked, then an availability of a TMVP of the sub-block C2 (1103) may be checked, followed by a TMVP of the sub-block C1 (1104). The choice from those motion vector predictors can be made by selecting an available predictor in the candidate list according to a predetermined order, such as the first available predictor. The choice from those motion vector predictors can also be made by selecting a pre-selected TMVP, such as the TMVP of the BR sub-block C0 (1102) if available.

According to some embodiments, the above methods can be used as a type of advanced motion vector prediction mode with a signaled MVD. When the current block is not coded in merge or skip mode, a block level flag may be used to indicate the use of a planar motion vector prediction mode with a MVD.

According to some embodiments, the above methods can be associated with a signaled reference picture. In this regard, a prediction direction (L0, L1, or bi-prediction) and a reference index for each direction are used to identify a reference picture. Alternatively, a default (inferred) reference picture can be used, such as a predefined co-located picture for a current slice, the first picture in a selected (such as use L0 by default) or signaled prediction list.

In one embodiment, if the prediction direction and the reference picture are signaled, but the motion vector predictor for the BR corner has a different reference picture, then the motion vector predictor for the BR corner is scaled to the signaled reference picture. In addition, all the motion information from the top neighboring sub-blocks and the left neighboring sub-blocks are also scaled to the signaled reference picture.

In another embodiment, if the prediction direction and reference picture are inferred when using a planar motion vector prediction, then a motion vector predictor for the BR corner is scaled to the inferred reference picture. In addition, all the motion information from the top neighboring sub-blocks and the left neighboring sub-blocks are scaled to the inferred reference picture. In such a case, when a planar motion vector prediction method is used, a signaling of a prediction direction and a reference index can be skipped.

In another embodiment, if a motion vector predictor for the BR corner is bi-predicted with two motion vectors but a signaled or an inferred prediction direction is uni-directional, then only the motion information of the motion vector predictor with the inferred or signaled direction is kept.

Figure 12:
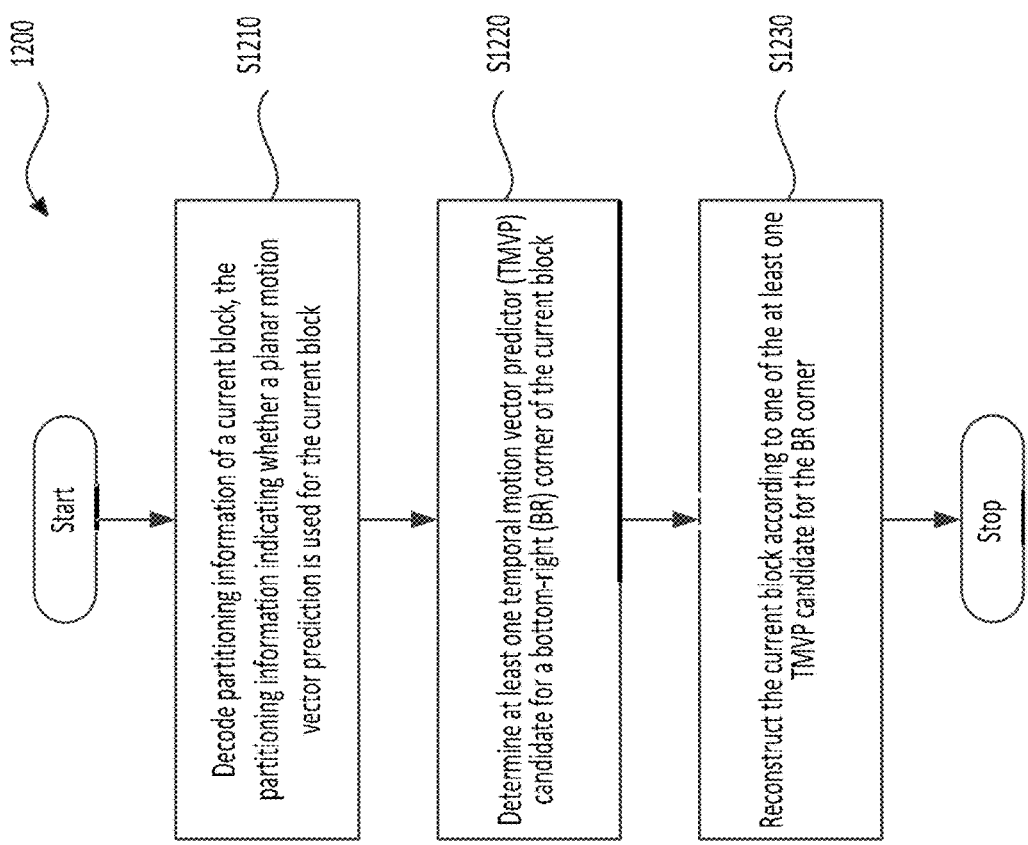
FIG. 12 shows a flow chart outlining an exemplary process according to an embodiment of the disclosure.

FIG. 12 shows a flow chart outlining an exemplary process (1200) according to an embodiment of the disclosure. The process (1200) can be used in the reconstruction of a block coded in intra mode, so as to generate a prediction block for the block under reconstruction. In various embodiments, the process (1200) are executed by processing circuitry, such as the processing circuitry in the terminal devices (210), (220), (230) and (240), the processing circuitry that performs functions of the video encoder (303), the processing circuitry that performs functions of the video decoder (310), the processing circuitry that performs functions of the video decoder (410), the processing circuitry that performs functions of the intra prediction module (452), the processing circuitry that performs functions of the video encoder (503), the processing circuitry that performs functions of the predictor (535), the processing circuitry that performs functions of the intra encoder (622), the processing circuitry that performs functions of the intra decoder (772), and the like. In some embodiments, the process (1200) is implemented in software instructions, thus when the processing circuitry executes the software instructions, the processing circuitry performs the process (1200). .

The process may generally start at step (S1210), where the process (1200) decodes prediction information for a current block in a current coded picture that is a part of a coded video sequence. The prediction information indicates whether a planar motion vector prediction mode is used for the current block. In addition, the current block is partitioned into a plurality of sub-blocks. In an embodiment, a reference picture for the current block is signaled in the prediction information. When the prediction information indicates the planar motion vector prediction mode is used for the current block, the process (1200) proceeds to (S1220).

The process (1200) process to step (S1220), where the process (1200) determines, in response to the use of the planar motion vector prediction mode, at least one temporal motion vector predictor (TMVP) candidate for a bottom-right (BR) corner of the current block.

In an embodiment, the BR corner can be inside of the current block. In another embodiment, the BR corner can be outside of the current block.

In an embodiment, the prediction information includes a motion vector difference (MVD) for the BR corner, and the process (1200) further includes determining a final motion vector based on the one of the at least one TMVP candidate for the BR corner and the MVD for the BR corner.

In an embodiment, when a reference picture of the one of the at least one TMVP candidate for the BR corner is different from the reference picture of the current block, the process (1200) scales the one of the at least one TMVP candidate for the BR corner to the reference picture of the current block, so that the current block is reconstructed according to the scaled one of the at least one TMVP candidate for the BR corner.

In an embodiment, the at least one TMVP candidate includes a TMVP candidate that is determined based on a co-located block in a reference picture. The co-located block in the reference picture is in a same location as a sub-block at the BR corner in the current coded picture.

In an embodiment, the at least one TMVP candidate for the BR corner includes a TMVP candidate for a sub-block located inside of the current block and adjacent to the BR corner.

In an embodiment, the at least one TMVP candidate for the BR corner includes a sub-block located inside of the current block and adjacent to a center of the current block.

In an embodiment, the at least one TMVP candidate for the BR corner includes a TMVP candidate of a bottom-left (BL) neighboring sub-block of the current block.

In an embodiment, the at least one TMVP candidate for the BR corner includes a TMVP candidate of an above-right (AR) neighboring sub-block of the current block.

In an embodiment, the at least one TMVP candidate for the BR corner includes a TMVP candidate that is a weighted average of motion vectors of a BL neighboring sub-block of the current block and an AR neighboring sub-block of the current block.

In an embodiment, the process (1200) selects the one of the at least one TMVP candidate from the at least one TMVP candidate based on a received index which identifies the one of the at least one TMVP candidate.

In an embodiment, the process (1200) selects the one of the at least one TMVP candidate from the at least one TMVP candidate based on a predetermined candidate order.

In an embodiment, the process (1200) selects the one of the at least one TMVP candidate from the at least one TMVP candidate based on a pre-selected TMVP candidate.

After determining one of the at least one temporal motion vector predictor (TMVP) candidate for the bottom-right (BR) corner of the current block, the process (1200) proceeds to step (S1230).

At (S1230), the process (1200) derives a motion vector predictor for each sub-block in the current block according to the one of the at least one TMVP candidate for the BR corner and reconstructs the current block according to the motion vector predictor for each of the sub-blocks in the current block.

After constructing the current block, the process (1200) terminates.

The techniques described above, can be implemented as computer software using computer-readable instructions and physically stored in one or more computer-readable media.

Figure 13:
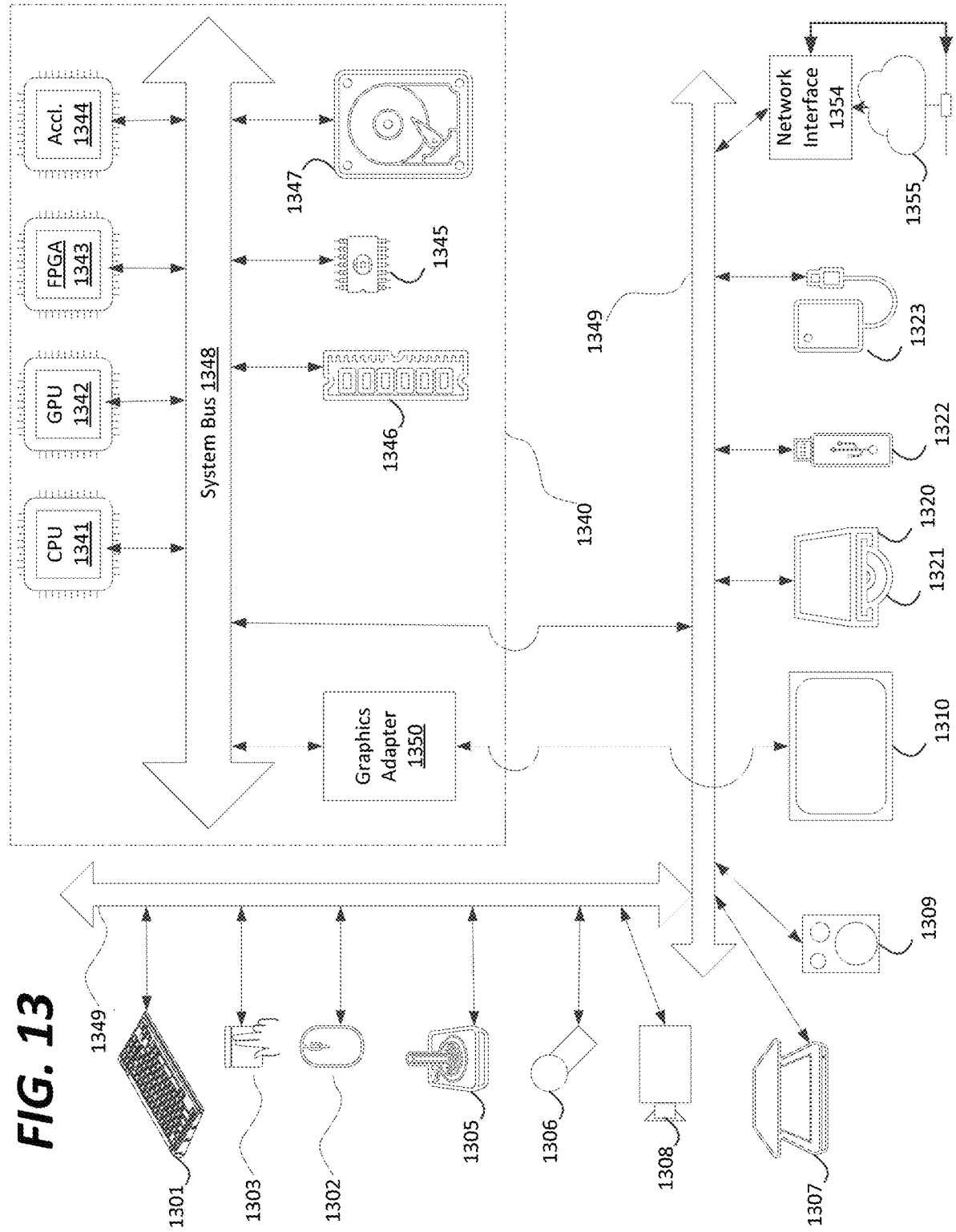
FIG. 13 is a schematic illustration of a computer system in accordance with an embodiment.

For example, FIG. 13 shows a computer system (1300) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

The components shown in FIG. 13 for computer system (1300) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (1300).

Computer system (1300) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (1301), mouse (1302), trackpad (1303), touch screen (1310), data-glove (not shown), joystick (1305), microphone (1306), scanner (1307), camera (1308).

Computer system (1300) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (1310), data-glove (not shown), or joystick (1305), but there can also be tactile feedback devices that do not serve as input devices), audio output devices (such as: speakers (1309), headphones (not depicted)), visual output devices (such as screens (1310) to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system (1300) can also include human accessible storage devices and their associated media such as optical media including CD/DVD ROM/RW (1320) with CD/DVD or the like media (1321), thumb-drive (1322), removable hard drive or solid state drive (1323), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (1300) can also include an interface to one or more communication networks. Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANbus, and so forth. Certain networks commonly require external network interface adapters that attached to certain general purpose data ports or peripheral buses (1349) (such as, for example USB ports of the computer system (1300)); others are commonly integrated into the core of the computer system (1300) by attachment to a system bus as described below (for example Ethernet interface into a PC computer system or cellular network interface into a smartphone computer system). Using any of these networks, computer system (1300) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (1340) of the computer system (1300).

The core (1340) can include one or more Central Processing Units (CPU) (1341), Graphics Processing Units (GPU) (1342), specialized programmable processing units in the form of Field Programmable Gate Areas (FPGA) (1343), hardware accelerators for certain tasks (1344), and so forth. These devices, along with Read-only memory (ROM) (1345), Random-access memory (1346), internal mass storage such as internal non-user accessible hard drives, SSDs, and the like (1347), may be connected through a system bus (1348). In some computer systems, the system bus (1348) can be accessible in the form of one or more physical plugs to enable extensions by additional CPUs, GPU, and the like. The peripheral devices can be attached either directly to the core's system bus (1348), or through a peripheral bus (1349). Architectures for a peripheral bus include PCI, USB, and the like.

CPUs (1341), GPUs (1342), FPGAs (1343), and accelerators (1344) can execute certain instructions that, in combination, can make up the aforementioned computer code. That computer code can be stored in ROM (1345) or RAM (1346). Transitional data can be also be stored in RAM (1346), whereas permanent data can be stored for example, in the internal mass storage (1347). Fast storage and retrieve to any of the memory devices can be enabled through the use of cache memory, that can be closely associated with one or more CPU (1341), GPU (1342), mass storage (1347), ROM (1345), RAM (1346), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (1300), and specifically the core (1340) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (1340) that are of non-transitory nature, such as core-internal mass storage (1347) or ROM (1345). The software implementing various embodiments of the present disclosure can be stored in such devices and executed by core (1340). A computer-readable medium can include one or more memory devices or chips, according to particular needs. The software can cause the core (1340) and specifically the processors therein (including CPU, GPU, FPGA, and the like) to execute particular processes or particular parts of particular processes described herein, including defining data structures stored in RAM (1346) and modifying such data structures according to the processes defined by the software. In addition or as an alternative, the computer system can provide functionality as a result of logic hardwired or otherwise embodied in a circuit (for example: accelerator (1344)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

(1) A method for video decoding in a decoder includes decoding prediction information for a current block in a current coded picture that is a part of a coded video sequence, the prediction information indicating whether a planar motion vector prediction mode is used for the current block, the current block being partitioned into a plurality of sub-blocks; determining, in response to the use of the planar motion vector prediction mode, at least one temporal motion vector predictor (TMVP) candidate for a bottom-right (BR) corner of the current block; and reconstructing the current block according to one of the at least one TMVP candidate for the BR corner.

(2) The method of feature (1), in which a reference picture for the current block is signaled in the prediction information.

(3) The method of feature (2), in response to determining that a reference picture of the one of the at least one TMVP candidate for the BR corner is different from the reference picture of the current block, includes scaling the one of the at least one TMVP candidate for the BR corner to the reference picture of the current block, in which the current block is reconstructed according to the scaled one of the at least one TMVP candidate for the BR corner.

(4) The method of feature (2), in which the prediction information includes a motion vector difference (MVD) for the BR corner, and the method further includes determining a final motion vector based on the one of the at least one TMVP candidate for the BR corner and the MVD for the BR corner.

(5) The method of feature (2), in which the at least one TMVP candidate includes a TMVP candidate that is determined based on a co-located block in a reference picture, the co-located block in the reference picture being in a same location as a sub-block at the BR corner in the current coded picture.

(6) The method of feature (5), in which the sub-block at the BR corner is located outside of the current block.

(7) The method of feature (5), in which the sub-block at the BR corner is inside of the current block.

(8) The method of feature (2), in which the at least one TMVP candidate for the BR corner includes at least one of: a TMVP candidate for one of a first sub-block located inside of the current block and adjacent to the BR corner and a second sub-block located inside of the current block and adjacent to a center of the current block; a TMVP candidate of a bottom-left (BL) neighboring sub-block of the current block; and a TMVP candidate of an above-right (AR) neighboring sub-block of the current block.

(9) The method of feature (2), in which the at least one TMVP candidate for the BR corner includes a TMVP candidate that is an average of motion vectors of a BL neighboring sub-block of the current block and an AR neighboring sub-block of the current block.

(10) The method of feature (2) further includes selecting the one of the at least one TMVP candidate from the at least one TMVP candidate from a candidate list, based on at least one of: a received index, the index identifying the one of the at least one TMVP candidate; a predetermined candidate order; and a pre-selected TMVP candidate.

(11) The method of claim (2) further includes selecting the one of the at least one TMVP candidate from a candidate list based on a received index and a predetermined candidate order, the received index identifying the one of the at least one TMVP candidate.

(12) The method of claim (2), in which the reconstructing includes deriving a motion vector predictor for each sub-block in the current block according to the one of the at least one TMVP candidate for the BR corner; and reconstructing the current block according to the motion vector predictor for each of the sub-blocks in the current block.

(13) An apparatus including a processing circuitry configured to decode prediction information for a current block in a current coded picture that is a part of a coded video sequence, the prediction information indicating whether a planar motion vector prediction mode is used for the current block, the current block being partitioned into a plurality of sub-blocks; determine, in response to the use of the planar motion vector prediction mode, at least one temporal motion vector predictor (TMVP) candidate for a bottom-right (BR) corner of the current block; and reconstruct the current block according to one of the at least one TMVP candidate for the BR corner.

(14) The apparatus of feature (13), in which a reference picture for the current block is signaled in the prediction information.

(15) The apparatus of feature (14), in which the processing circuitry, in response to determining that a reference picture of the one of the at least one TMVP candidate for the BR corner is different from the reference picture of the current block, is further configured to scale the one of the at least one TMVP candidate for the BR corner to the reference picture of the current block, wherein the current block is reconstructed according to the scaled one of the at least one TMVP candidate for the BR corner.

(16) The apparatus of feature (14), in which the prediction information includes a motion vector difference (MVD) for the BR corner, and the processing circuitry is further configured to determine a final motion vector based on the one of the at least one TMVP candidate for the BR corner and the MVD for the BR corner.

(17) The apparatus of feature (14), in which the at least one TMVP candidate includes a TMVP candidate that is determined based on a co-located block in a reference picture, the co-located block in the reference picture being in a same location as a sub-block at the BR corner in the current coded picture.

(18) The apparatus of feature (14), in which the at least one TMVP candidate for the BR corner includes at least one of: a TMVP candidate for one of a first sub-block located inside of the current block and adjacent to the BR corner and a second sub-block located inside of the current block and adjacent to a center of the current block; a TMVP candidate of a bottom-left (BL) neighboring sub-block of the current block; and a TMVP candidate of an above-right (AR) neighboring sub-block of the current block.

(19) The apparatus of feature (14), in which the at least one TMVP candidate for the BR corner includes a TMVP candidate that is a weighted average of motion vectors of a BL neighboring sub-block of the current block and an AR neighboring sub-block of the current block.

(20) A non-transitory computer-readable storage medium storing a program executable by at least one processor to perform: decoding prediction information for a current block in a current coded picture that is a part of a coded video sequence, the prediction information indicating whether a planar motion vector prediction mode is used for the current block, the current block being partitioned into a plurality of sub-blocks; determining, in response to the use of the planar motion vector prediction mode, at least one temporal motion vector predictor (TMVP) candidate for a bottom-right (BR) corner of the current block; and reconstructing the current block according to one of the at least one TMVP candidate for the BR corner.

APPENDIX A: ACRONYMS

JEM: joint exploration model
VVC: versatile video coding
BMS: benchmark set
MV: Motion Vector
HEVC: High Efficiency Video Coding
SEI: Supplementary Enhancement Information
VUI: Video Usability Information
GOPs: Groups of Pictures
TUs: Transform Units,
PUs: Prediction Units
CTUs: Coding Tree Units
CTBs: Coding Tree Blocks
PBs: Prediction Blocks
HRD: Hypothetical Reference Decoder
SNR: Signal Noise Ratio
CPUs: Central Processing Units
GPUs: Graphics Processing Units
CRT: Cathode Ray Tube
LCD: Liquid-Crystal Display
OLED: Organic Light-Emitting Diode
CD: Compact Disc
DVD: Digital Video Disc
ROM: Read-Only Memory
RAM: Random Access Memory
ASIC: Application-Specific Integrated Circuit
PLD: Programmable Logic Device
LAN: Local Area Network
GSM: Global System for Mobile communications
LTE: Long-Term Evolution
CANbus: Controller Area Network Bus
USB: Universal Serial Bus
PCI: Peripheral Component Interconnect
FPGA: Field Programmable Gate Areas
SSD: solid-state drive
IC: Integrated Circuit
CU: Coding Unit While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method for video decoding in a decoder, comprising:
   decoding prediction information for a current block in a current coded picture that is a part of a coded video sequence, the prediction information indicating whether a planar motion vector prediction mode is used for the current block, the current block being partitioned into a plurality of sub-blocks;
   determining, in response to the use of the planar motion vector prediction mode, at least one temporal motion vector predictor (TMVP) candidate for a bottom-right (BR) corner of the current block; and
   reconstructing the current block according to one of the at least one TMVP candidate for the BR corner.

2. The method of claim 1, wherein a reference picture for the current block is signaled in the prediction information.

3. The method of claim 2, further comprising:
   when a reference picture of the one of the at least one TMVP candidate for the BR corner is different from the reference picture of the current block,
   scaling the one of the at least one TMVP candidate for the BR corner to the reference picture of the current block, wherein the current block is reconstructed according to the scaled one of the at least one TMVP candidate for the BR corner.

4. The method of claim 2, wherein the prediction information includes a motion vector difference (MVD) for the BR corner, and the method further includes determining a final motion vector based on the one of the at least one TMVP candidate for the BR corner and the MVD for the BR corner.

5. The method of claim 2, wherein the at least one TMVP candidate includes a TMVP candidate that is determined based on a co-located block in a reference picture, the co-located block in the reference picture being in a same location as a sub-block at the BR corner in the current coded picture.

6. The method of claim 5, wherein the sub-block at the BR corner is located outside of the current block.

7. The method of claim 5, wherein the sub-block at the BR corner is inside of the current block.

8. The method of claim 2, wherein the at least one TMVP candidate for the BR corner includes at least one of:
   a TMVP candidate for one of a first sub-block located inside of the current block and adjacent to the BR corner and a second sub-block located inside of the current block and adjacent to a center of the current block;
   a TMVP candidate of a bottom-left (BL) neighboring sub-block of the current block; and a TMVP candidate of an above-right (AR) neighboring sub-block of the current block.

9. The method of claim 2, wherein the at least one TMVP candidate for the BR corner includes a TMVP candidate that is an average of motion vectors of a BL neighboring sub-block of the current block and an AR neighboring sub-block of the current block.

10. The method of claim 2, further comprising:
selecting the one of the at least one TMVP candidate from a candidate list, based on at least one of
a received index, the index identifying the one of the at least one TMVP candidate;
a predetermined candidate order; and
a pre-selected TMVP candidate.

11. The method of claim 2, further comprising:
selecting the one of the at least one TMVP candidate from a candidate list based on a received index and a predetermined candidate order, the received index identifying the one of the at least one TMVP candidate.

12. The method of claim 2, wherein the reconstructing comprises:
deriving a motion vector predictor for each sub-block in the current block according to the one of the at least one TMVP candidate for the BR corner; and
reconstructing the current block according to the motion vector predictor for each of the sub-blocks in the current block.

13. An apparatus, comprising a processing circuitry configured to:
decode prediction information for a current block in a current coded picture that is a part of a coded video sequence, the prediction information indicating whether a planar motion vector prediction mode is used for the current block, the current block being partitioned into a plurality of sub-blocks;
determine, in response to the use of the planar motion vector prediction mode, at least one temporal motion vector predictor (TMVP) candidate for a bottom-right (BR) corner of the current block; and
reconstruct the current block according to one of the at least one TMVP candidate for the BR corner.

14. The apparatus of claim 13, wherein a reference picture for the current block is signaled in the prediction information.

15. The apparatus of claim 14, wherein the processing circuitry is further configured to:
when a reference picture of the one of the at least one TMVP candidate for the BR corner is different from the reference picture of the current block,
scale the one of the at least one TMVP candidate for the BR corner to the reference picture of the current block, wherein the current block is reconstructed according to the scaled one of the at least one TMVP candidate for the BR corner.

16. The apparatus of claim 14, wherein the prediction information includes a motion vector difference (MVD) for the BR corner, and the processing circuitry is further configured to determine a final motion vector based on the one of the at least one TMVP candidate for the BR corner and the MVD for the BR corner.

17. The apparatus of claim 14, wherein the at least one TMVP candidate includes a TMVP candidate that is determined based on a co-located block in a reference picture, the co-located block in the reference picture being in a same location as a sub-block at the BR corner in the current coded picture.

18. The apparatus of claim 14, wherein the at least one TMVP candidate for the BR corner includes at least one of:
a TMVP candidate for one of a first sub-block located inside of the current block and adjacent to the BR corner and a second sub-block located inside of the current block and adjacent to a center of the current block;
a TMVP candidate of a bottom-left (BL) neighboring sub-block of the current block; and
a TMVP candidate of an above-right (AR) neighboring sub-block of the current block.

19. The apparatus of claim 14, wherein the at least one TMVP candidate for the BR corner includes a TMVP candidate that is a weighted average of motion vectors of a BL neighboring sub-block of the current block and an AR neighboring sub-block of the current block.

20. A non-transitory computer-readable storage medium storing a program executable by at least one processor to perform:
decoding prediction information for a current block in a current coded picture that is a part of a coded video sequence, the prediction information indicating whether a planar motion vector prediction mode is used for the current block, the current block being partitioned into a plurality of sub-blocks;
determining, in response to the use of the planar motion vector prediction mode, at least one temporal motion vector predictor (TMVP) candidate for a bottom-right (BR) corner of the current block; and
reconstructing the current block according to one of the at least one TMVP candidate for the BR corner.

* * * * *